United States Patent

Matsuda

(10) Patent No.: US 12,425,526 B2
(45) Date of Patent: Sep. 23, 2025

(54) STORAGE MEDIUM, INFORMATION PROCESSING APPARATUS, AND CONTROL METHOD FOR CHANGING AN ORIENTATION OF DRAWING DATA

(71) Applicant: CANON KABUSHIKI KAISHA, Tokyo (JP)

(72) Inventor: Shoichi Matsuda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/155,500

(22) Filed: Jan. 17, 2023

(65) Prior Publication Data

US 2023/0247165 A1    Aug. 3, 2023

(30) Foreign Application Priority Data

Jan. 28, 2022    (JP) .................................. 2022-012428

(51) Int. Cl.
*H04N 1/387* (2006.01)
*H04N 1/00* (2006.01)
*H04N 1/23* (2006.01)

(52) U.S. Cl.
CPC ....... *H04N 1/3877* (2013.01); *H04N 1/00639* (2013.01); *H04N 1/2315* (2013.01); *H04N 1/2323* (2013.01); *H04N 1/233* (2013.01); *H04N 1/2392* (2013.01)

(58) Field of Classification Search
None
See application file for complete search history.

(56) References Cited

U.S. PATENT DOCUMENTS

| 11,704,082 | B2 * | 7/2023 | Baba ..................... G06F 3/1252 358/1.5 |
| 2016/0224293 | A1 * | 8/2016 | Nakagawa ............ G06F 3/1231 |
| 2020/0012459 | A1 * | 1/2020 | Yamazaki ............. G06F 3/1228 |
| 2020/0314254 | A1 * | 10/2020 | Iwasaki ................. G06F 3/1203 |
| 2020/0356314 | A1 * | 11/2020 | Saito ....................... G06F 3/122 |
| 2021/0209429 | A1 | 7/2021 | Kakitsuba |

FOREIGN PATENT DOCUMENTS

| JP | 2004235889 A | * | 8/2004 |
| JP | 2005056001 A | | 3/2005 |
| JP | 2020095535 A | * | 6/2020 |
| JP | 2021108001 A | | 7/2021 |

OTHER PUBLICATIONS

JP-2004235889-A English Translation (Year: 2004).*
JP-2020-095535-A English Translation (Year: 2020).*

* cited by examiner

*Primary Examiner* — Miya J Cato
(74) *Attorney, Agent, or Firm* — Canon U.S.A., Inc. IP Division

(57) ABSTRACT

In a case where a setting that is a target of a first control is set in a print setting, the first control is performed, whereas in a case where the setting that is the target of the first control is not set in the print setting, the first control is not performed. The first control is performed to change an orientation of a drawing data such that the drawing data is printed on a sheet in an orientation with a bottom side and a top side of the drawing data respectively corresponding to a downstream side and an upstream side of the sheet in a conveyance direction of conveying the sheet to a printing apparatus that performs print processing to print the drawing data.

15 Claims, 15 Drawing Sheets

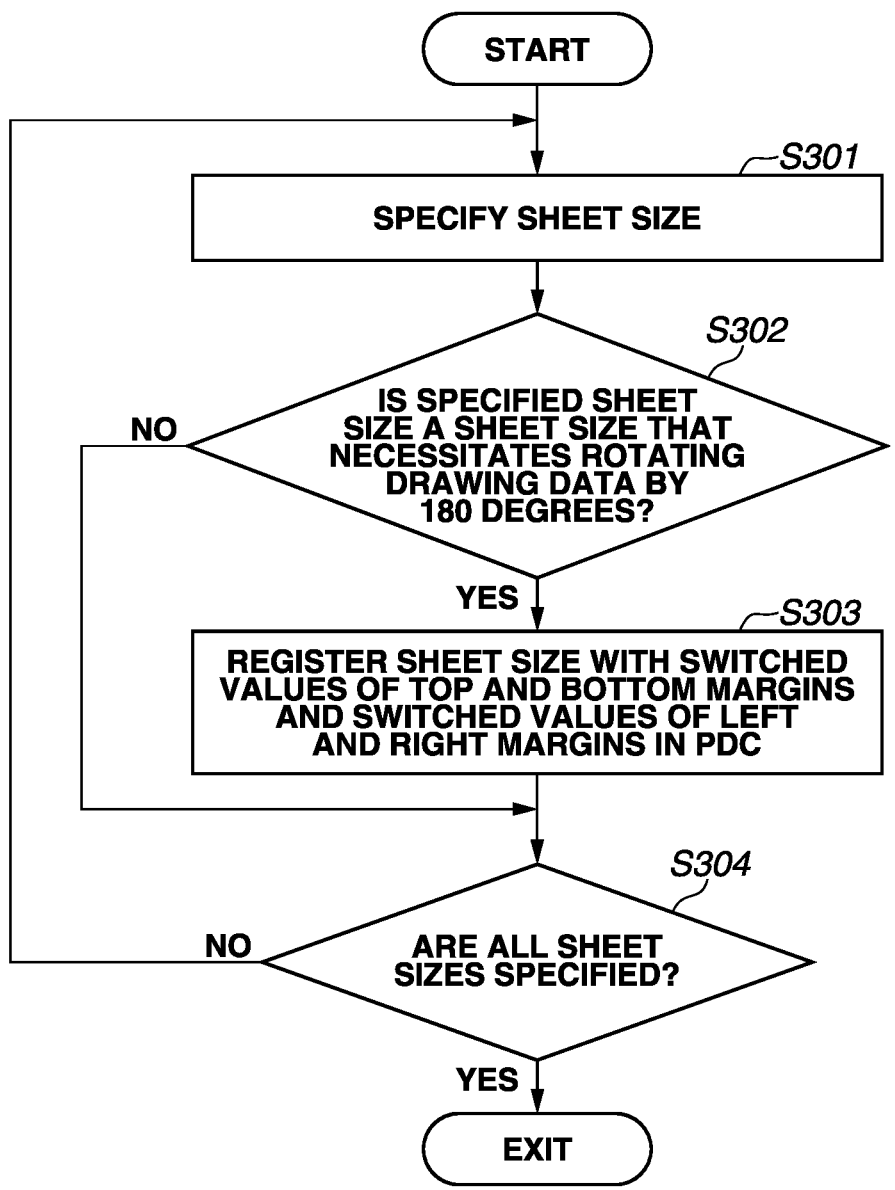

FIG.4

```xml
<?xml version="1.0" encoding="utf-8"?>
<PrintDeviceCapabilities
 xmlns:ns0001="http://www.canon.com/ns/printschema/inkjet/v100" ...>
...
<psk:PageMediaSize psf2:psftype="Feature">
  <psk:ISOA4 psf2:psftype="Option" psf2:default="true"> ~402
    <psk12:PortraitImageableSize...>5600,5000,198000,287000</psk12:PortraitImageableSize>
    <psk:MediaSizeHeight xsi:type="xsd:integer" psf2:psftype="Scored Property">297000</psk:MediaSizeHeight>
    <psk:MediaSizeWidth xsi:type="xsd:integer" psf2:psftype="ScoredProperty">210000</psk:MediaSizeWidth>
  </psk:ISOA4>
  ...
  <psk:JapanChou4Envelope psf2:psftype="Option">
    <psk12:PortraitImageableSize...>5600,8000,108800,222000</psk12:PortraitImageableSize> ~403
    <psk:MediaSizeHeight xsi:type="xsd:integer" psf2:psftype="Scored Property">235000</psk:MediaSizeHeight>
    <psk:MediaSizeWidth xsi:type="xsd:integer" psf2:psftype="ScoredProperty">120000</psk:MediaSizeWidth>
  </psk:JapanChou4Envelope>
  <psk:JapanChou4Envelope_CN psf2:psftype="Option"> ~404
    <psk12:PortraitImageableSize...>5600,5000,108800,222000</psk12:PortraitImageableSize> ~405
    <psk:MediaSizeHeight xsi:type="xsd:integer" psf2:psftype="Scored Property">235000</psk:MediaSizeHeight>
    <psk:MediaSizeWidth xsi:type="xsd:integer" psf2:psftype="ScoredProperty">120000</psk:MediaSizeWidth>
  </psk:JapanChou4Envelope>
...
</psk:PageMediaSize>
...
</PrintDeviceCapabilities>
```

401

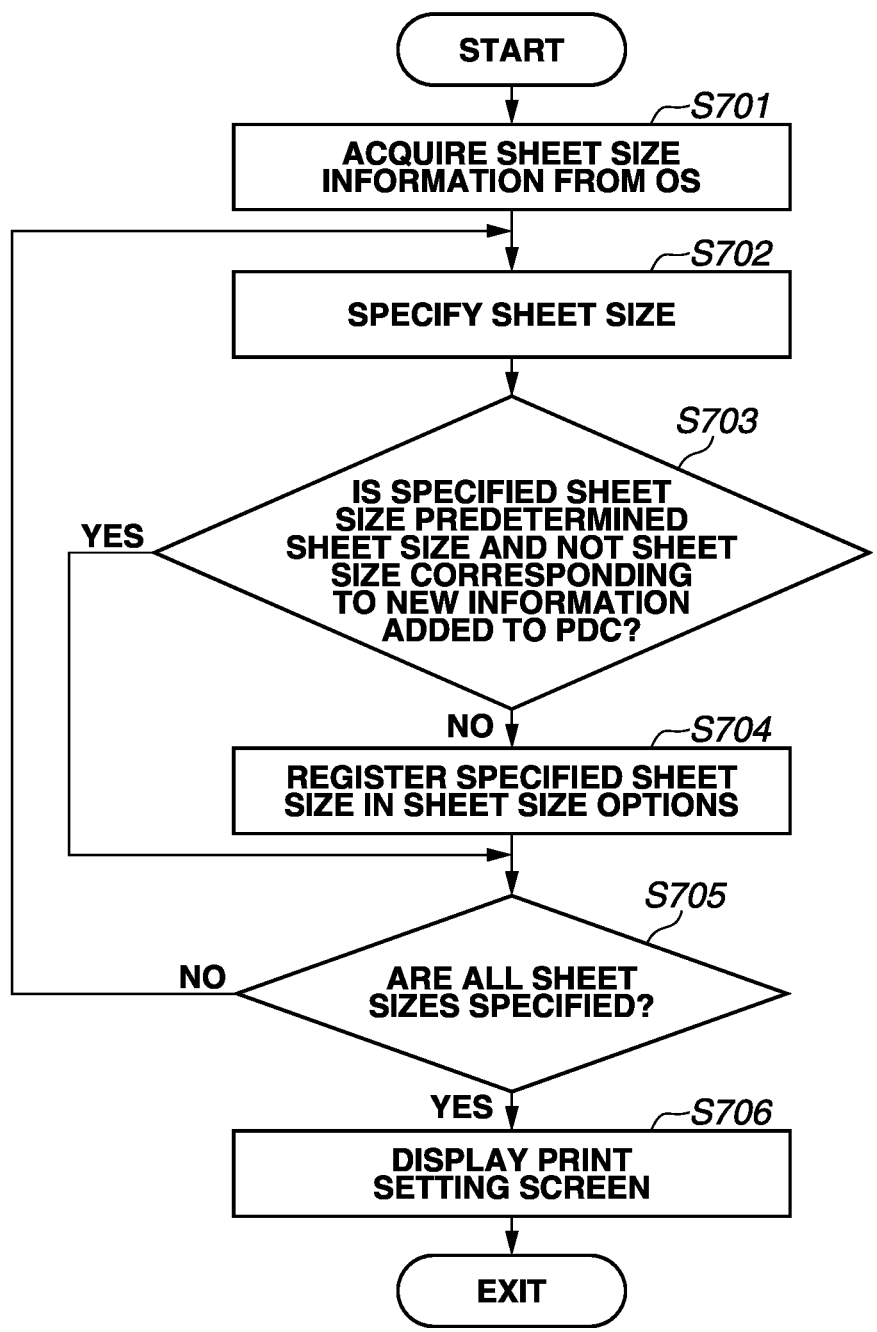

<NORMAL PRINTING>

<PORTRAIT ENVELOPE PRINTING>

STORAGE MEDIUM, INFORMATION PROCESSING APPARATUS, AND CONTROL METHOD FOR CHANGING AN ORIENTATION OF DRAWING DATA

BACKGROUND

Field of the Disclosure

The present disclosure relates to a storage medium, an information processing apparatus, and a control method.

Description of the Related Art

Techniques for changing a layout direction of image data to be printed on a printing medium depending on print settings in causing a printing apparatus to print the image data are known. For example, Japanese Patent Application Laid-Open No. 2020-95535 discusses a technique for rotating a layout of image data to be printed by 180 degrees and then printing the rotated image data.

In such a printing apparatus, however, further improvements of convenience for functions may be made in printing image data.

SUMMARY

According to an aspect of the present disclosure, an extension application configured to extend, by being associated with print data generation software, a function of the print data generation software for shared use by a plurality of printing apparatuses provided by a different vendor, the storage medium storing a program for causing a computer to acquire drawing data and information about a print setting including information about a sheet on which the drawing data is to be printed, the drawing data including image data and a margin area corresponding to a region where the image data is not to be printed. In a case where a setting that is a target of a first control is set in the print setting, the first control of changing an orientation of the drawing data such that the drawing data is printed on the sheet in an orientation with a bottom side and a top side of the drawing data respectively corresponding to a downstream side and an upstream side of the sheet in a conveyance direction of conveying the sheet to a printing apparatus that performs print processing to print the drawing data is performed, and in a case where the setting that is the target of the first control is not set in the print setting, the first control is not performed.

Further features of the present disclosure will become apparent from the following description of embodiments with reference to the attached drawings.

BRIEF DESCRIPTION OF THE DRAWINGS

FIG. 3 is a flowchart illustrating a process of editing print function information (PDC).

FIG. 4 is a diagram illustrating an example of edited PDC.

FIG. 7 is a flowchart illustrating a process of displaying a print setting screen.

DESCRIPTION OF THE EMBODIMENTS

Figure 1:
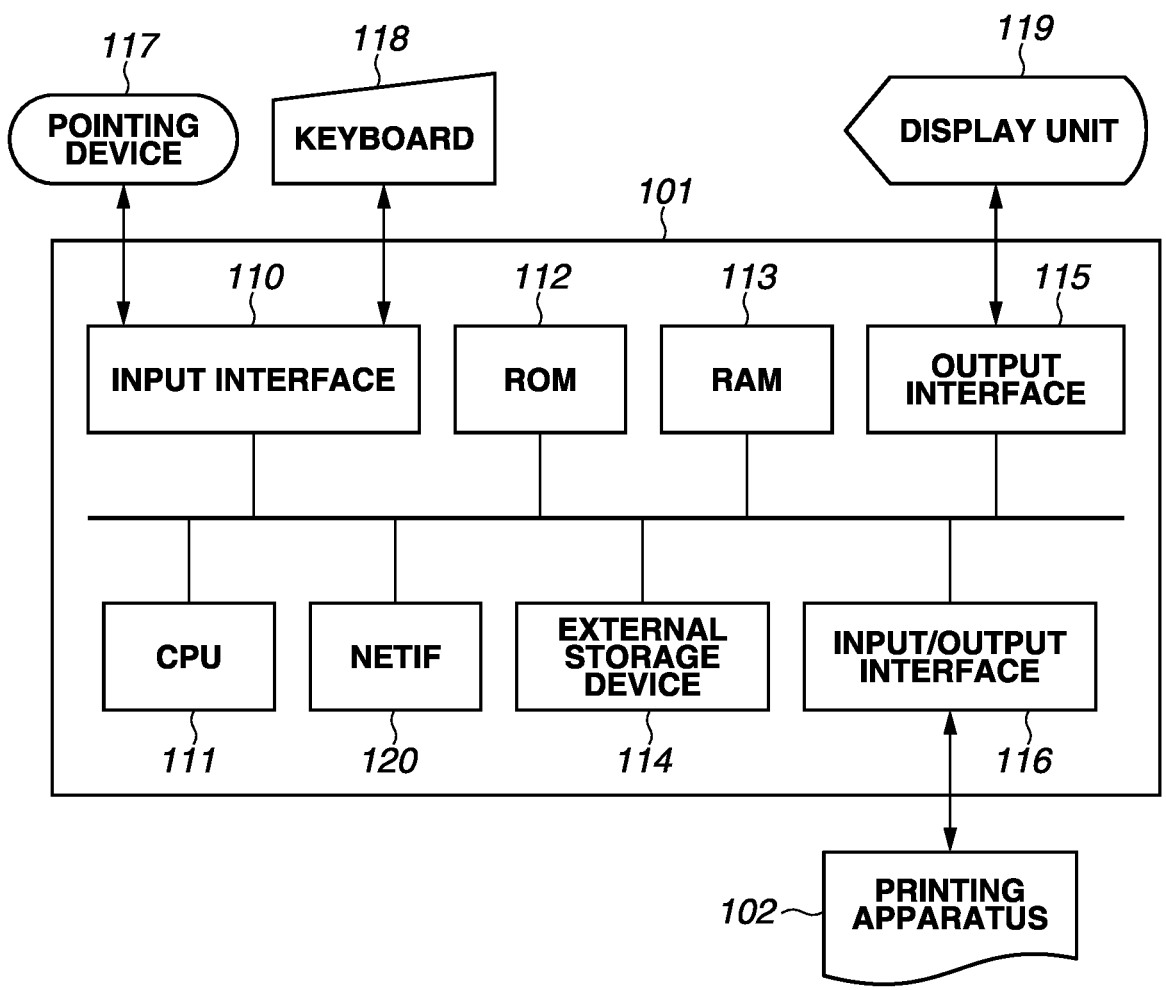
FIG. 1 is a block diagram illustrating a hardware configuration of a system.

Various embodiments of the present disclosure will be described below with reference to the drawings. It should be understood that the scope of the present disclosure also encompasses changes and modifications made to the below-described embodiments as needed based on ordinary skills in the art without departing from the spirit of the disclosure.

An information processing apparatus and a printing apparatus that are included in a printing system according to a first embodiment will now be described. A host computer 101 is an example of an information processing apparatus including an input interface 110, a central processing unit (CPU) 111, a read-only memory (ROM) 112, a random access memory (RAM) 113, an external storage device 114, an output interface 115, and an input/output interface 116. Input devices, such as a keyboard 118 and a pointing device 117, are connected to the input interface 110, and a display device, such as a display unit 119, is connected to the output interface 115. A network interface (NETIF) 120 performs control for performing data transfer to and from external devices via a network.

The ROM 112 stores an initialization program. The external storage device 114 stores application programs, an operating system (OS), print data generation software, and various other types of data. An extension application 204 described below is stored in the ROM 112 or the external storage device 114. The RAM 113 is used as a work memory in executing various programs stored in the external storage device 114, and various programs are operable in the host computer 101.

According to the present embodiment, the CPU 111 performs processing according to the procedures of programs stored in the ROM 112, thereby performing below-described functions of the host computer 101 and below-described processes of flowcharts.

A printing apparatus 102 is connected to the host computer 101 via the input/output interface 116. While the host computer 101 and the printing apparatus 102 are separated herein, the host computer 101 and the printing apparatus 102 can be configured to be a single information processing apparatus.

The host computer 101 is described as an example of an information processing apparatus 101 according to the present embodiment, but the present embodiment is not limited to the example. For example, various apparatuses, such as a mobile terminal, a personal computer, a tablet terminal, a personal digital assistant (PDA), and a digital camera are applicable as an information processing apparatus. A printer is described as an example of the printing apparatus 102 according to the present embodiment, but the present embodiment is also applicable to, for example, an inkjet printer, a full-color laser beam printer, and a monochrome printer.

There is a known configuration that issues a print instruction to the printing apparatus 102 connected to the host computer 101 using a printer driver installed in the host computer 101 as software for controlling the printing apparatus 102. In the host computer 101, the OS, which is basic software, is installed. The printer driver is configured based on specifications defined by the OS and is called from the OS to operate. A vendor of the printing apparatus 102 provides the printer driver that conforms to the specifications of the OS, and thereby the vendor can provide a unit for instructing the printing apparatus 102 to print using the OS. In recent years, Windows® provides a standard class driver (hereinafter, also referred to as "standard driver") that can be used commonly by printing apparatuses provided by a plurality of vendors. Such a standard driver is included in a package of the OS and easily becomes ready to be used by connecting a printing apparatus to the host computer 101. Thus, it is unnecessary to separately install a model-specific printer driver suitable for the printing apparatus 102, and convenience is high. Further, the standard driver is configured such that a print function corresponding to print capabilities generated based on information acquired from the connected printing apparatus 102 can be designated. Thus, a user using the standard driver can designate a print function corresponding to capabilities of the connected printing apparatus 102 while using the single standard driver. According to the present embodiment, the standard driver is described as print data generation software 202.

The extension application 204 will now be described. An application (the extension application 204) for extending a function can be associated with the standard driver. The extension application 204 can be provided by the vendor that provides the printing apparatus 102. By providing the extension application 204, the vendor can provide a function (extension function) that cannot be realized by the standard driver alone.

The extension application 204 is software for extending a function of the print data generation software 202 and is software that is not pre-included in the OS (not included in the package of the OS). Thus, the user operates the host computer 101 to download the extension application 204 from a server via the Internet and installs the extension application 204. Alternatively, the extension application 204 can automatically be installed when the printing apparatus 102 is connected to the host computer 101. Specifically, in a case where the printing apparatus 102 is connected to the host computer 101, the OS acquires device identification information from the printing apparatus 102.

The OS can download the extension application 204 corresponding to the acquired device identification information from the server via the Internet and install the extension application 204. Specifically, the print data generation software 202 and the extension application 204 are stored as separate files in the host computer 101. The print data generation software 202 and the extension application 204 may be updated to upgrade a version, and this update processing is performed at different timings. Specifically, the host computer 101 acquires the print data generation software 202 and the extension application 204 at different timings. Further, a trigger to acquire the print data generation software 202 by the host computer 101 and a trigger to acquire the extension application 204 by the host computer 101 are also different. In a case where the extension application 204 is installed, the OS associates the extension application 204 with the print data generation software 202 and the printing apparatus 102.

The extension application 204 according to the present embodiment includes a print setting screen extension unit 205, a skip control unit 206, a print function extension unit 207, a print data editing unit 208, and a notification unit 209. The extension application 204 also includes shared information 210. The shared information 210 is commonly accessible from each unit. The shared information 210 is a file stored in the external storage device 114 or information stored on the RAM 113. The extension application 204 writes and reads information to and from the shared information 210 using an application program interface (API) provided by the OS.

Figure 2A:
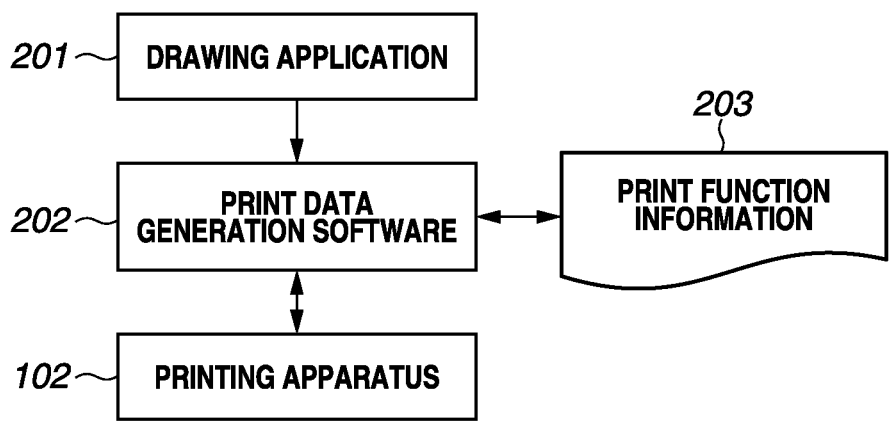
FIGS. 2A and 2B are block diagrams illustrating a configuration of software of an information processing apparatus and a printing apparatus.
Figure 2B:
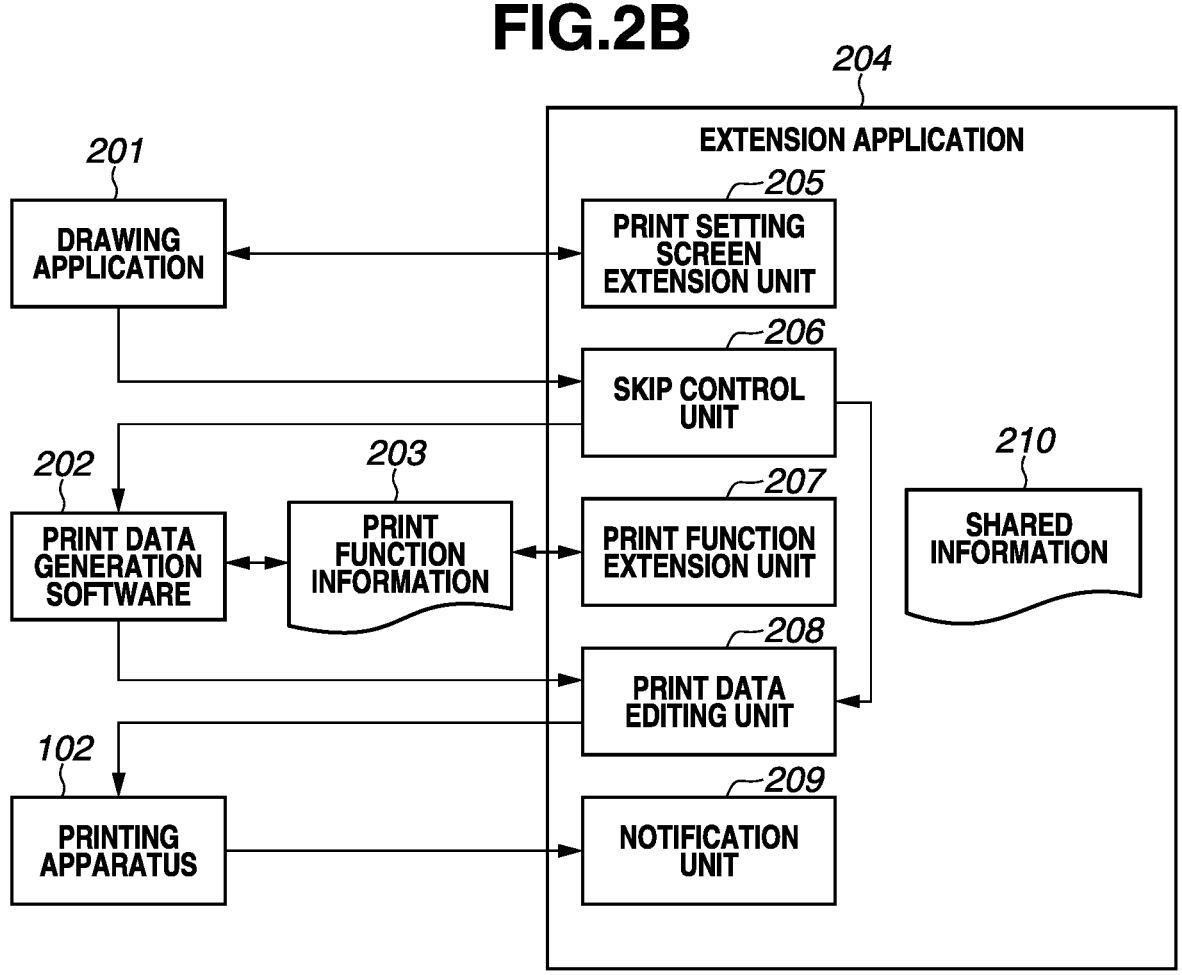

FIGS. 2A and 2B are diagrams schematically illustrating a configuration of a printing system including software of the host computer 101 and the printing apparatus 102. In the diagrams, it is assumed that a printing system uses the host computer 101 in which a Microsoft® Windows® 11 is installed as the OS. FIG. 2A is a diagram illustrating a general configuration in a case where the extension application 204 is not associated with the print data generation software 202 and the printing apparatus 102.

A drawing application 201 is software that generates drawing data (image data) to be printed. For example, a document creation application and a spreadsheet application correspond to the drawing application 201. Upon receiving a print request from a user, the drawing application 201 issues a print instruction to the OS. The print instruction includes print setting information for specifying operations of the print data generation software 202 and the printing apparatus 102. The print setting information is also referred to as PrintTicket (hereinafter, "PT").

The drawing application 201 can display a print setting screen provided by one of the print data generation software 202, the OS, and the drawing application 201 in order to output the print setting information. The print setting screen displays setting items and control items based on capabilities information (operability information about the printing apparatus 102) acquired from the print data generation software 202. The setting items indicate settable print functions, and the control items indicate setting values of the setting items. The capabilities information is also referred to as PrintCapabilities (hereinafter, "PC"). The print data generation software 202 determines the PC based on print function information 203. The print function information 203 is data indicating print functions that describe all settable print functions and setting values, and an exclusive relationship between the setting values. The print function information 203 is also referred to as Print Device Capabilities (PDC). The print function information 203 is included in a configuration file of the print data generation software 202 and is arranged in the external storage device 114 as an unchangeable file. Alternatively, the print function information 203 can be generated dynamically by the print data generation software 202. Specifically, the print data generation software 202 or the OS can be configured to acquire attribute data about the printing apparatus 102 from the printing apparatus 102 and to generate the print function information 203 based on attribute information in the acquired attribute data. In a case where the print function information 203 is generated dynamically, the generated print function information 203 is editable. The attribute data about the printing apparatus 102 that is acquired from the printing apparatus 102 refers to a response acquired by issuing a Get-Printer-Attributes operation of an Internet Print Protocol (IPP) to the printing apparatus 102. The response includes attribute information indicating functions (capabilities of the printing apparatus 102) operable by the printing apparatus 102 and setting values relating to the attribute information. The response is stored in the RAM 113.

As described above, the print data generation software 202 is configured such that a user can designate, for each connected printing apparatus 102, a print function that can be used in the printing apparatus 102. Specifically, the print data generation software 202 is configured such that a user can designate a print function that can be used for each connected printing apparatus even in a case where printing apparatuses having different functions or printing apparatuses developed by different vendors are connected. A configuration that uses an IPP Class Driver installed in Windows® 11 as the print data generation software 202 is described herein. The IPP Class Driver is a printer driver that performs print processing according to specifications of a standard print protocol referred to as IPP and is included in the package of the OS. The IPP Class Driver is not a printer driver specific to the model of the printing apparatus 102 but a standard class driver that can be used commonly by a plurality of printing apparatuses. The IPP class driver also acquires capabilities information about the connected printing apparatus 102 and generates the print function information 203 based on the information so that a user can designate a print function that is supported by the connected printing apparatus 102.

Herein, a process of transmitting print data to the printing apparatus 102 and printing the print data will be described in FIG. 2A. The OS generates intermediate data (also referred to as input data) based on a print instruction output from the drawing application 201 and transmits the intermediate data to the print data generation software 202.

Drawing data output from the drawing application 201 is data in Graphics Device Interface (GDI) format (GDI-format data) or data in Extensible Markup Language (XML) Paper Specification (XPS) format (XPS-format data). In a case where an IPP Class Driver is used as the print data generation software 202 and data output from the drawing application 201 is GDI-format data, the OS converts the GDI-format data output from the drawing application 201 into XPS-format data. Then, the OS transmits the converted XPS-format data to the print data generation software 202 as intermediate data. If data output from the drawing application 201 is XPS-format data, the OS transmits the XPS-format data to the print data generation software 202 as intermediate data. The intermediate data includes image data that is information about an image to be formed on a sheet, information about a margin area of the sheet, which will be described below, and print setting information set by a user. The information about the margin area can be included in sheet size information included in the print setting information.

The print data generation software 202 converts the acquired intermediate data into print data interpretable with the printing apparatus 102 and transmits the converted print data to the printing apparatus 102. The print data includes drawing data that is information about an image to be formed on a sheet and print setting attribute information (attribute information designating print settings) generated based on the print setting information set by a user. The print setting attribute information includes attribute information indicating functions (capabilities of the printing apparatus) that can be operated by the printing apparatus 102 and setting values relating to the attribute information.

The printing apparatus 102 performs printing (prints) on a sheet based on the print data transmitted from the print data generation software 202. At this time, the printing apparatus 102 forms the drawing data included in the print data on a sheet through operations based on the print setting attribute information included in the print data. The print setting attribute information includes regarding sheet type, sheet size, print quality (e.g., image quality priority, speed priority), drawing data size, and drawing position (margin area of the sheet).

FIG. 2B is a diagram illustrating a configuration in a case where the extension application 204 is associated with the print data generation software 202 and the printing apparatus 102. Unless otherwise specified, configurations and processes are similar to those in FIG. 2A.

In a case where a print request is received from a user, the drawing application 201 issues a print instruction to the OS. Under this configuration, as in the configuration illustrated in FIG. 2A, the drawing application 201 can display a print setting screen. Under the configuration, a print setting screen provided by the extension application 204 is displayed. Specifically, a print setting screen provided by the print setting screen extension unit 205 of the extension application 204 is displayed. Whether the print setting screen provided by the print setting screen extension unit 205 is displayed depends on a user operation.

In a case where the drawing application 201 receives a print request from a user and issues a print instruction to the OS, the OS activates the skip control unit 206. The skip control unit 206 performs control whether to skip a process of the print data generation software 202. After the skip control processing by the skip control unit 206, the OS generates intermediate data based on the print instruction output from the drawing application 201 and transmits the intermediate data to the print data generation software 202. In a case where the skip control unit 206 does not perform the skip control, the print data generation software 202 processes the intermediate data into print data interpretable by the printing apparatus 102 and transfers the print data to the print data editing unit 208. In contrast, in a case where the print data generation software 202 is skipped, the intermediate data is not processed by the print data generation software 202 and is transferred to the print data editing unit 208. The print data editing unit 208 thereby processes the intermediate data.

The print data editing unit 208 edits the intermediate data transferred from the print data generation software 202 or the print data processed by the print data generation software 202. For example, in n-in-1 printing, the editing is performed such that the print data editing unit 208 changes a layout of the intermediate data or the print data based on the print setting information about the n-in-1 printing received from the OS. Further, the print data editing unit 208 can display a user interface (UI) screen on the display unit 119 and can display a layout result of the intermediate data or the print data as a preview screen. In a state where the screen remains open, the print data editing unit 208 does not transmit the print data to the printing apparatus 102, and when the screen is closed, the print data transmission processing is operated.

After the print data editing unit 208 edits the print data, the edited print data is transmitted to the printing apparatus 102. The printing apparatus 102 performs printing on a sheet based on the received print data.

In a case where the skip control unit 206 skips the print data generation software 202, the print data editing unit 208 can convert the received intermediate data into print data interpretable by the printing apparatus 102. Further, a function provided by the OS can be used to convert intermediate data into print data.

The extension application 204 includes the print function extension unit 207. The print function extension unit 207 edits the print function information 203 (PDC) generated by the print data generation software 202 or the OS. The print function extension unit 207 can thereby add a function provided by the extension application 204, a function that is supported by the printing apparatus 102 but is not supported by the print data generation software 202, and an exclusive relationship between setting values of the print function. The OS activates the print function extension unit 207 when the extension application 204 is associated with the printing apparatus 102 and the print data generation software 202 for the first time. Furthermore, the OS can activate the print function extension unit 207 at another timing, such as a timing at which the OS is activated. With the foregoing configuration, in a case where an optional device (e.g., finisher) is added afterward to the printing apparatus 102 and a printing-related function is extended, the print function extension unit 207 detects the extended function and adds the extended function to the print function information 203.

Further, the extension application 204 includes the notification unit 209. The notification unit 209 displays a notification to a user in response to an error in the printing apparatus 102. For example, when an out-of-sheet error occurs in the printing apparatus 102, the print data generation software 202 detects the out-of-sheet error, and the OS displays a message on the display unit 119 using a notification function of the OS that is referred to as "toast notification". If a user presses the toast notification, the notification unit 209 of the extension application 204 is called by the OS, and a UI screen of the notification unit 209 is displayed. The UI screen of the notification unit 209 displays, for example, a message indicating details of the out-of-sheet error and a sheet replenishment method.

The extension application 204 for realizing the present embodiment is not limited to a configuration that includes all of the above-described functions (units) and can have a configuration that includes only part of the functions or a configuration that includes another function. The extension application 204 is sometimes simply referred to as printing software. As described above, the extension application 204 includes at least one of the function of displaying a setting screen (the print setting screen extension unit 205), the function of controlling whether to skip the process of the print data generation software 202 (the skip control unit 206), the function of editing print data to be input to the printing apparatus 102 (the print data editing unit 208), the function of extending a function that can be designated with the print data generation software 202 (the print function extension unit 207), and the function of displaying a screen in response to an error in the printing apparatus 102 (the notification unit 209).

The extension application 204 can end an operation each time a process of each unit ends. In this case, the OS activates the extension application 204 each time a request to use a unit is received. Alternatively, for example, while the OS ends an operation of the extension application 204 when a process of the print setting screen extension unit 205 ends, the OS can maintain the extension application 204 in an activated state even if the process of the skip control unit 206 ends.

Alternatively, the extension application 204 can cancel a process of a unit during the process. When the process is cancelled, a job on a print queue that is being processed is deleted by the OS.

Meanwhile, the drawing data including the image data and the margin area is printed in a direction from a top side to a bottom side of the drawing data displayed as a preview on the host computer 101. Specifically, the drawing data is printed in an orientation such that a downstream side of a sheet in a sheet conveyance (sheet discharge) direction corresponds to the top side of the drawing data, and an upstream side of the sheet in the sheet conveyance direction corresponds to the bottom side of the drawing data. The image data is generated on the drawing application 201 by a user and is to be printed in a drawing region of a sheet by the printing apparatus 102. Further, the margin area is an area that is situated around the drawing region where the image data is to be printed on the sheet and corresponds to an empty space where the image data is not to be printed.

Depending on the print setting designated on the print setting screen by a user, the drawing data may be printed in an orientation rotated (reversed) by 180 degrees compared to a case where the drawing data is printed in a correct orientation on a designated sheet. For example, in a case where the drawing data is to be printed on a portrait envelope, a user may feed the portrait envelope with a flap of the portrait envelope on the upstream side in a conveyance direction of the portrait envelope in the printing apparatus 102 in order to prevent a paper jam. The correct orientation in printing the portrait envelope is an orientation in which the top side of the drawing data corresponds to the flap side of the portrait envelope. The drawing application 201, however, generates the drawing data in an orientation (layout) based on a case where the portrait envelope is fed such that the flap of the portrait envelope is on the downstream side with respect to the feeding direction of the portrait envelope to the printing apparatus 102. Thus, the drawing data is printed in an orientation in which the bottom side of the drawing data corresponds to the flap side of the portrait envelope as a result of printing the drawing data on the portrait envelope. Specifically, the image data may be printed in the reversed (rotated) orientation on the portrait envelope.

In printing on the portrait envelope in the correct orientation, the drawing data is desirably printed with a narrow margin area above the image data and a wide margin area below the image data. Thus, in a case where the data is generated by reversing the image data on the drawing application 201, the drawing data may be printed with a wide margin area above the image data and a narrow margin area below the image data, although the image data is printable in the correct orientation on the portrait envelope. Even in a case where the image data is reversed on the drawing application 201 and the drawing data is further generated with a narrow margin area above the image data and a wide margin area below the image data, the drawing region of the portrait envelope in the printing apparatus 102 is unchanged, and thus the drawing data may be printed with part of the image data or the entire image data missing. Furthermore, since a user operation of reversing the image data on the drawing application 201 is necessary, the usability decreases.

In a case where the sheet size is set such that the drawing data is printed in the orientation rotated (reversed) by 180 degrees compared to a case where the drawing data is printed in the correct orientation on the designated sheet, such as the portrait envelope, the drawing region of the portrait envelope that is reversed may be preset depending on the printing apparatus 102. Specifically, there are cases where a wide margin area is set on the downstream side in the sheet printing direction and a narrow margin area is set on the upstream side in the sheet printing direction based on anticipation that the image data may be printed from the bottom side to the top side. This may thus decrease the possibility that the image data is printed in the correct orientation on the portrait envelope with part of the image data or the entire image data missing in a case where the drawing data is generated by reversing the image data on the drawing application 201 by a user. The drawing application 201, however, displays the previous drawing data before being reversed by the user, i.e., the drawing data with a wide margin area above the image data and a narrow margin area below the image data. Thus, it may be difficult for the user to recognize a print result with ease. Furthermore, since a user operation of reversing the image data on the drawing application 201 is necessary, the usability decreases.

The term "above the image data" refers to a position above the image data in the correct orientation defined by the user and is typically a position above the image data that is displayed on the drawing application 201 in generating the image data by the user.

According to the present embodiment, the extension application 204 determines whether the sheet size is a sheet size that necessitates rotating the drawing data by 180 degrees, based on the sheet size or the print setting designated by the user. In a case where the extension application 204 determines that the sheet size is a sheet size (e.g., portrait envelope) that necessitates rotating the drawing data by 180 degrees, the extension application 204 rotates the drawing data including the margin area and the image data by 180 degrees. Specifically, a control of changing the orientation of the drawing data is performed such that the drawing data is printed with the bottom side and the top side of the drawing data respectively corresponding to the downstream side and the upstream side of the sheet in the sheet conveyance direction. This reduces the printing of the drawing data in the orientation rotated by 180 degrees compared to a case where the drawing data is printed in the correct orientation with respect to the sheet, depending on the print setting designated by the user. Further, the possibility is reduced that the drawing data is printed with part of the image data or the entire image data missing or with a wide margin area above the image data and a narrow margin area below the image data. Furthermore, automatically generating the drawing data rotated by 180 degrees compared to the orientation in a case where the drawing data is printed in the correct orientation reduces an operation to be performed by the user.

In a case where the extension application 204 determines that the sheet size (e.g., portrait envelope) is a sheet size that necessitates rotating the drawing data by 180 degrees, a control is performed of switching a value of a length of a top margin area of the image data with a value of a length of a bottom margin area of the image data, and switching a value of a length of the left margin area of the image data with a value of a length of the right margin area of the image data. Then, the extension application 204 rotates the drawing data by 180 degrees. The extension application 204 can determine whether the sheet size is a sheet size that necessitates rotating the drawing data by 180 degrees, and the margin area is set such that the margin area on the downstream side in the sheet conveyance direction and the margin area on the upstream side in the sheet conveyance direction are respectively wide and narrow. Specifically, as described above, it is determined whether the margin area is set such that the margin area on the downstream side in the sheet conveyance direction of the portrait envelope and the margin area on the upstream side in the sheet conveyance direction of the portrait envelope are respectively wide and narrow. In a case where it is determined that the sheet size is a sheet size that necessitates rotating the drawing data by 180 degrees, and the margin area is set such that the margin area on the downstream side in the sheet conveyance direction and the margin area on the upstream side in the sheet conveyance direction are respectively wide and narrow, the extension application 204 performs the control of switching the value of the length of the top margin area of the image data with the value of the length of the bottom margin area of the image data, and switching the value of the length of the left margin area of the image data with the value of the length of the right margin area of the image data. The extension application 204 then rotates the drawing data by 180 degrees. This enables the drawing application 201 to display the drawing data with a narrow margin area above the image data and a wide margin area below the image data, and the user can easily recognize a print result. Furthermore, automatically generating the drawing data rotated by 180 degrees compared to the orientation in a case where the drawing data is printed in the correct orientation reduces an operation to be performed by the user.

FIG. 3 is a flowchart illustrating a process of editing the PDC by the print function extension unit 207. The flowchart in FIG. 3 is started when the OS activates the print function extension unit 207 at a timing at which the extension application 204 is associated with the print data generation software 202 for the first time. While the print function extension unit 207 is sometimes described below as a performer of a process, in reality, a corresponding function is realized by the CPU 111 by executing a corresponding program.

In step S301, the print function extension unit 207 specifies a sheet size from all sheet sizes in the PDC.

In step S302, the print function extension unit 207 determines whether the specified sheet size is a sheet size that necessitates rotating the drawing data by 180 degrees. Specifically, the print function extension unit 207 determines whether a sheet size that is a target of a control of changing a printing direction of the drawing data is set such that the drawing data is printed in the orientation with the bottom side and the top side of the drawing data respectively corresponding to the downstream side and the upstream side of the sheet in the sheet conveyance direction. For example, in a case where the specified sheet size is the portrait envelope, the print function extension unit 207 determines that the specified sheet size is a sheet size that necessitates rotating the drawing data by 180 degrees, whereas in a case where the specified sheet size is, for example, a sheet size other than the portrait envelope, such as A4 size, the print function extension unit 207 determines that the specified sheet size is not a sheet size that necessitates rotating the drawing data by 180 degrees. In a case where the print function extension unit 207 determines "YES" in step S302, the processing proceeds to step S303. In a case where the print function extension unit 207 determines "NO" in step S302, the processing proceeds to step S304. Specifically, in a case where the specified sheet size is determined as not a sheet size that necessitates rotating the drawing data by 180 degrees, a control is not performed of registering a drawing region based on values obtained by switching the value of the length of the top margin area of the specified sheet size with the value of the length of the bottom margin area of the specified sheet size, and switching the value of the length of the left margin area of the specified sheet size with the value of the length of the right margin area of the specified sheet size as a new drawing region of the specified sheet size in the PDC. Even in a case where the specified sheet size is the portrait envelope and the margin area on the downstream side in the printing direction is narrower than the margin area on the upstream side in the printing direction, the print function extension unit 207 determines "NO" in step S302. Specifically, the determination can determine whether the sheet size is a sheet size that necessitates rotating the drawing data by 180 degrees and the margin area is set such that the margin area on the downstream side in the sheet conveyance direction and the margin area on the upstream side in the sheet conveyance direction are respectively wide and narrow. Specifically, as described above, it is determined whether the margin area is set such that the margin area on the downstream side in the sheet conveyance direction of the portrait envelope and the margin area on the upstream side in the sheet conveyance direction of the portrait envelope are respectively wide and narrow. Then, in a case where it is determined that the sheet size is a sheet size that necessitates rotating the drawing data by 180 degrees and the margin area is set such that the margin area on the downstream side in the sheet conveyance direction and the margin area on the upstream side in the sheet conveyance direction are respectively wide and narrow, the extension application 204 can perform the control of switching the value of the length of the top margin area of the image data with the value of the length of the bottom margin area of the image data, and switching the value of the length of the left margin area of the image data with the value of the length of the right margin area of the image data.

In step S303, the print function extension unit 207 registers, as new margin values of the specified sheet size, values obtained by rotating margin values of the sheet size specified in step S301 by 180 degrees in the PDC. Specifically, a drawing region based on values obtained by switching a value of a length of a top margin area of the specified sheet size with a value of a length of a bottom margin area of the specified sheet size, and switching a value of a length of a left margin area of the specified sheet size with a value of a length of a right margin area of the specified sheet size is registered (generated) as new values of the drawing region of the specified sheet size in the PDC.

In step S304, the print function extension unit 207 determines whether all the sheet sizes in the PDC are specified. In a case where the print function extension unit 207 determines "YES" in step S304, the process in the flowchart is ended. Whereas in a case where the print function extension unit 207 determines "NO" in step S304, the processing returns to step S301.

Figure 5A:
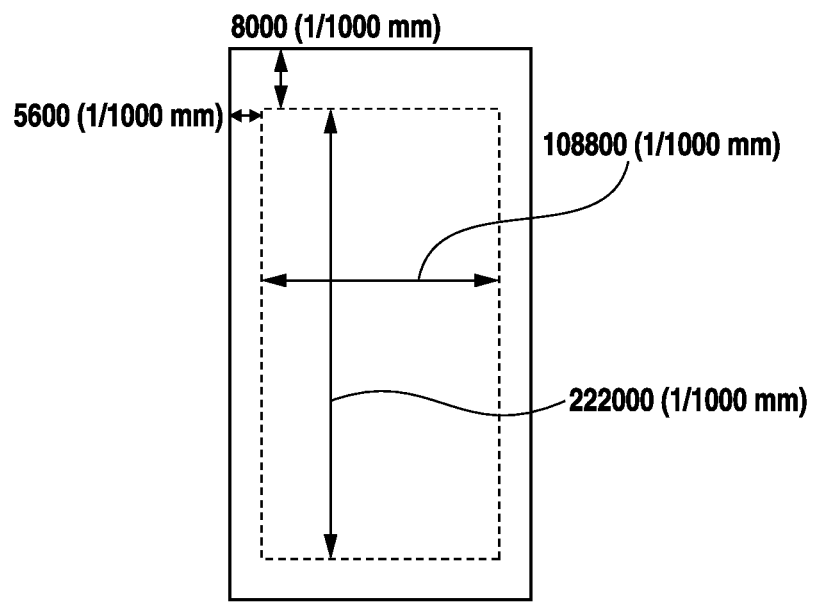
FIGS. 5A and 5B are diagrams illustrating a drawing start position and a drawing region on a Japan chou-4 envelope.
Figure 5B:
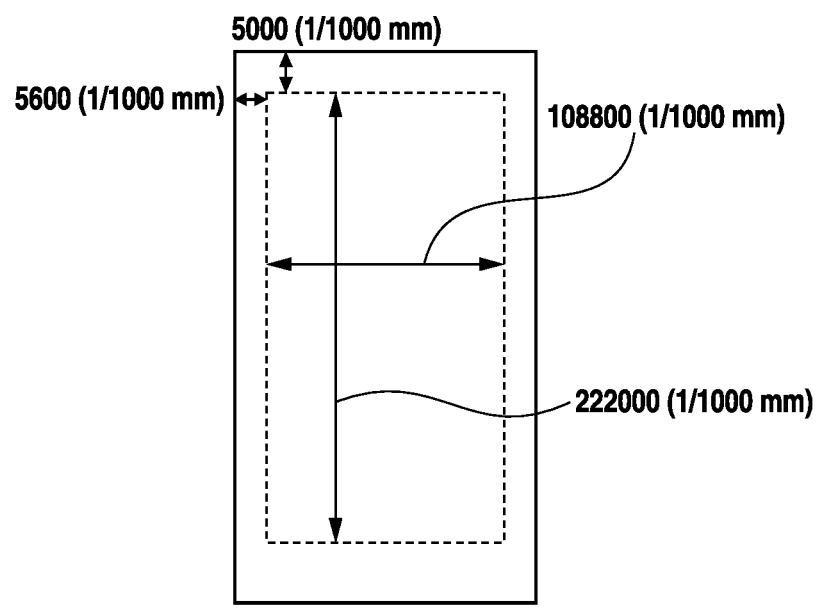

An example of the PDC will now be described with reference to FIG. 4. A PDC 401 includes information about functions (Feature) supported by the printing apparatus 102 and information about setting values (Option) in a function. For example, information 402 is information indicating that the printing apparatus 102 supports ISOA4 and JapanChou4Envelope (Japan chou-4 envelope) as PageMediaSize (sheet size). A user can designate a sheet size supported by the printing apparatus 102 as a print setting on the host computer 101. PortraitImageableSize indicates a drawing start position and a drawing region of each sheet size, and values of PortraitImageableSize indicate a horizontal direction drawing start position, a vertical direction drawing start position, a horizontal direction drawable size, and a vertical direction drawable size in this order from the left based on the upper left of the sheet as a reference. Specifically, drawing region information 403 of JapanChou4Envelope (Japan chou-4 envelope) indicates that a drawing can be formed in a drawing area of a horizontal direction drawing start position=5600 ($\frac{1}{1000}$ mm) and a vertical direction drawing start position=8000 ($\frac{1}{1000}$ mm), with a width=108800 ($\frac{1}{1000}$ mm) and a height=222000 ($\frac{1}{1000}$ mm), based on the upper left of the sheet of the Japan chou-4 envelope having a sheet size with a width=120000 ($\frac{1}{1000}$ mm) and a height=235000 ($\frac{1}{1000}$ mm) as a reference, as illustrated in FIG. 5A. Thus, a top margin is 8000 ($\frac{1}{1000}$ mm), a bottom margin is 5000 ($\frac{1}{1000}$ mm), and left and right margins are each 5600 ($\frac{1}{1000}$ mm). Information 404 is information (JapanChou4Envelope_CN (Japan chou-4 envelope with switched top and bottom margins and switched left and right margins)) that is added as a sheet size with margins of JapanChou4Envelope (Japan chou-4 envelope) that are rotated by 180 degrees. Drawing region information 405 about the added sheet size is a drawing region based on values obtained by switching a value of a length of a top margin area of the drawing region information 403 about the sheet size defined by the OS with a value of a length of a bottom margin area of the drawing region information 403, and switching a value of a length of a left margin area of the drawing region information 403 with a value of a length of a right margin area of the drawing region information 403. Specifically, the drawing region information 405 indicates that a drawing can be formed in a drawing area of a horizontal direction drawing start position=5600 ($\frac{1}{1000}$ mm) and a vertical direction drawing start position=5000 ($\frac{1}{1000}$ mm), with a width=108800 ($\frac{1}{1000}$ mm) and a height=222000 ($\frac{1}{1000}$ mm), based on the upper left of the sheet of the Japan chou-4 envelope having a sheet size with a width=120000 ($\frac{1}{1000}$ mm) and a height=235000 ($\frac{1}{1000}$ mm) as a reference, as illustrated in FIG. 5B. Thus, the top margin is 5000 ($\frac{1}{1000}$ mm), the bottom margin is 8000 ($\frac{1}{1000}$ mm), and the left and right margins are each 5600 ($\frac{1}{1000}$ mm). According to the present embodiment, the left and right margins are the same. Thus, the value of the horizontal direction drawing start position is the same as the value (5600 ($\frac{1}{1000}$ mm)) in a case where the margin values of the sheet size defined by the OS are not rotated by 180 degrees. In contrast, the vertical direction drawing start position changes to 5000 ($\frac{1}{1000}$ mm), which is a length corresponding to the top margin in FIG. 5B and the bottom margin in FIG. 5A. While margin information rotated by 180 degrees is added and registered in the PDC in the above-described example according to the present embodiment, the drawing region information about the sheet size defined by the OS can overwrite drawing region information of the information added as the sheet size with margins obtained by rotating the margins of the sheet size defined by the OS by 180 degrees. Further, in a case where equal sheet sizes cannot be added due to a restriction of the OS, a sheet size shifted by a minimum unit of $\frac{1}{1000}$ mm can be registered.

A user can configure a setting indicating a sheet size of a sheet fed to the printing apparatus 102 by opening a print setting screen of the extension application 204 on the drawing application 201. Specifically, the drawing application 201 issues an instruction to display the print setting screen of the extension application 204 using the API of the OS, the OS calls the print setting screen extension unit 205 of the extension application 204, and the print setting screen is displayed.

Figure 6:
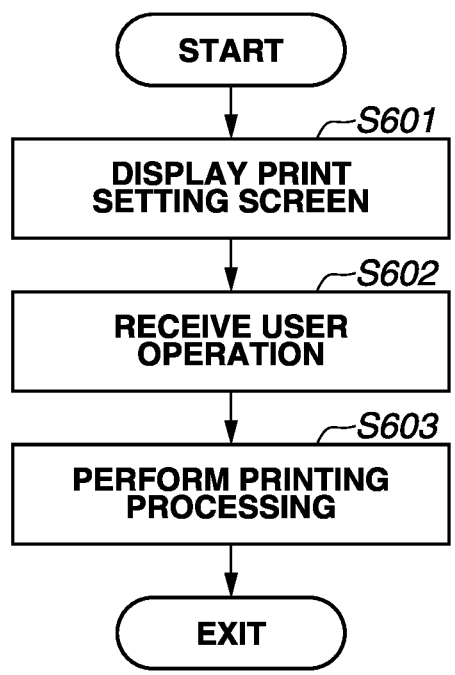
FIG. 6 is a flowchart illustrating a process of an extension application.

FIG. 6 is a flowchart illustrating a process that is performed by the extension application 204. The flowchart in FIG. 6 is started in response to an operation for displaying the print setting screen is performed by a user. The operation for displaying the print setting screen refers to, for example, an operation of pressing information about the print setting screen to be opened by the extension application 204 on a screen of the drawing application 201. While the extension application 204 is sometimes described below as a performer of a process, in reality, a corresponding function is realized by the CPU 111 by executing a corresponding program.

Figure 8A:
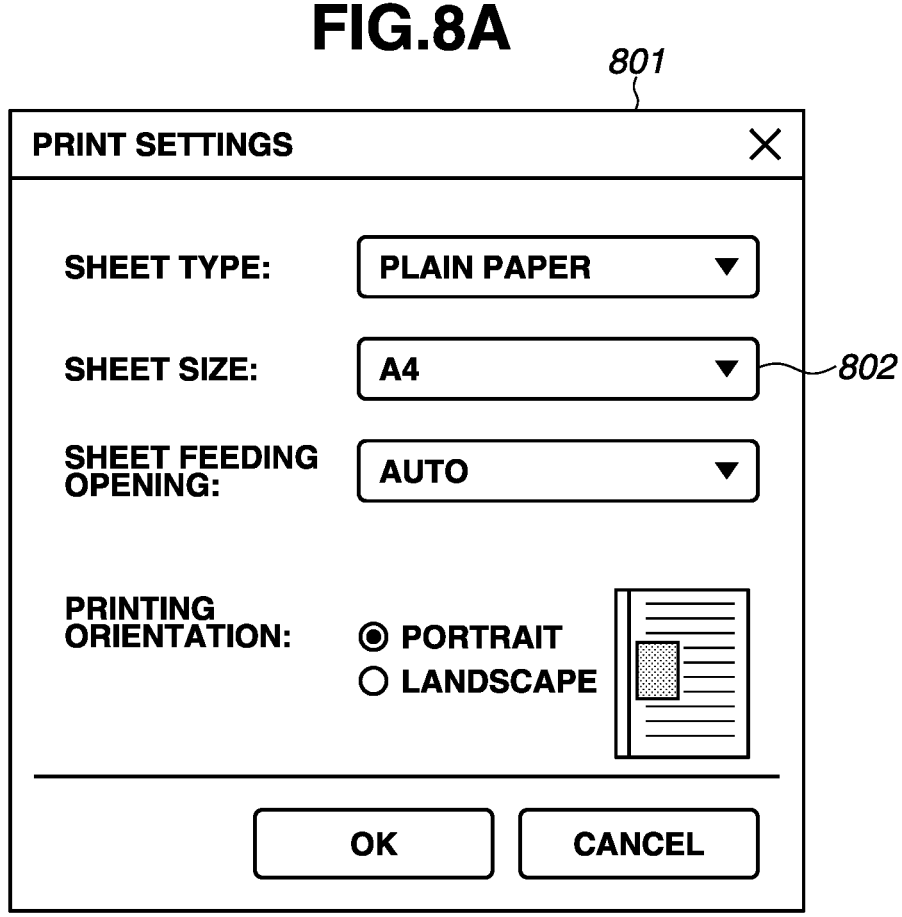
FIGS. 8A and 8B illustrate an example of a print setting screen.

In step S601, the extension application 204 displays a print setting screen 801 illustrated in FIG. 8A described below. Details thereof will be described below with reference to a flowchart illustrated in FIG. 7.

In step S602, the extension application 204 receives a user operation on the print setting screen 801. Specifically, the setting of various items, such as sheet type and sheet size, is received on the print setting screen 801 displayed in step S601.

In step S603, the extension application 204 performs print processing in a case where intermediate data is received from the OS, and the process in the flowchart is ended. Details thereof will be described below with reference to a flowchart illustrated in FIG. 9.

FIG. 7 corresponding to step S601 in FIG. 6 is a flowchart illustrating a process of displaying the print setting screen performed by the print setting screen extension unit 205 in the printing system. The flowchart in FIG. 7 is started when an operation of displaying the print setting screen is performed by a user. While the print setting screen extension unit 205 is sometimes described below as a performer of a process, in reality, a corresponding function is realized by the CPU 111 by executing a corresponding program.

In step S701, the print setting screen extension unit 205 receives PrintCapabilities (PC) from the OS. The PC is capabilities information generated based on the PDC information by the OS. An example of a case where PC information generated based on the PDC information including the added sheet size of the Japan chou-4 envelope with the switched values of the top and bottom margins and the switched values of the left and right margins as illustrated in FIG. 4 is added is transmitted will be described below.

In step S702, the print setting screen extension unit 205 specifies a sheet size from sheet size information in the PC generated by the OS. The specified sheet size information includes the information 402 and the information 404 illustrated in FIG. 4.

In step S703, the print setting screen extension unit 205 determines whether the specified sheet size is a predetermined sheet size and is not a sheet size corresponding to the information newly added to the PDC. The predetermined sheet size herein refers to a sheet size that necessitates rotating the drawing data to be printed on the sheet size by 180 degrees and is, for example, the portrait envelope. The information 402 among the PDC information in FIG. 4 is the JapanChou4Envelope (Japan chou-4 envelope), which is originally defined by the OS. Thus, the information 402 is a sheet size that necessitates rotating the drawing data by 180 degrees and necessitates rotating the margins by 180 degrees, so that the information 402 is determined as not a sheet size that corresponds to the information newly added to the PDC (YES in step S703). Further, the information 404 among the PDC information in FIG. 4 is a sheet size that necessitates rotating the drawing data by 180 degrees and is the JapanChou4Envelope_CN (the Japan chou-4 envelope with the switched values of the top and bottom margins and the switched values of the left and right margins) newly added as a sheet size with the switched values of the top and bottom margins and the switched values of the left and right margins to the PDC. Thus, the information 404 is determined as a sheet size that corresponds to the information newly added to the PDC (NO in step S703). In a case where the specified sheet size is a sheet size (e.g., A4 size) that does not necessitate rotating the drawing data to be printed on the sheet size by 180 degrees, the determination result in step S703 is "NO". In a case where the print setting screen extension unit 205 determines "YES" in step S703, the processing proceeds to step S705. In a case where the print setting screen extension unit 205 determines "NO" in step S703, the processing proceeds to step S704.

In step S704, the print setting screen extension unit 205 registers the sheet size specified in step S702 in options of a sheet size setting 802 in FIG. 8A described below. In a case where the determination result in step S703 is "NO", the sheet size specified in step S702 is not registered in the options of the sheet size setting 802.

In step S705, the print setting screen extension unit 205 determines whether all the sheet sizes in the PC are specified in step S702. In a case where the print setting screen extension unit 205 determines "YES" in step S705, the print setting screen extension unit 205 displays the print setting screen 801 in step S706, and the process in the flowchart is ended. In a case where the print setting screen extension unit 205 determines "NO" in step S705, the processing returns to step S702.

Figure 8B:
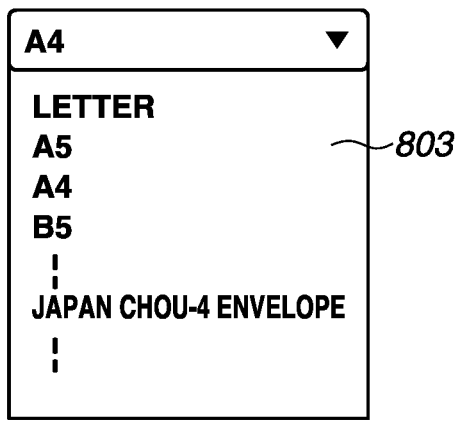

The print setting screen 801 displayed on the display unit 119 performed by the print setting screen extension unit 205 will now be described with reference to FIGS. 8A and 8B.

The sheet size setting 802 is a sheet size setting item and displays settable sheet size options based on the PC acquired from the OS in the flowchart in FIG. 7. The sheet size setting 802 is a combo box, and if a user clicks the sheet size setting 802 with the pointing device 117, a settable sheet size option list 803 is displayed as illustrated in FIG. 8B, and the user can select a sheet size from the displayed options. The option list 803 displays the sheet size registered in step S704 in FIG. 7. Thus, the JapanChou4Envelope (Japan chou-4 envelope) that is originally defined in the PDC by the OS is not displayed, while the JapanChou4Envelope_CN (the Japan chou-4 envelope with the switched values of the top and bottom margins and the switched values of the left and right margins) newly added to the PDC as a sheet size with the switched values of the top and bottom margins and the switched values of the left and right margins is displayed as an option "JAPAN CHOU-4 ENVELOPE". At this time, a name displayed on the sheet size setting 802 and the sheet size option list 803 can be a name generated by the OS in generating the PDC or can be a name determined by the extension application 204.

The drawing application 201 also provides (displays) a print setting screen on the drawing application 201. The two options that are the JapanChou4Envelope (Japan chou-4 envelope), which is originally defined in the PDC by the OS, and the JapanChou4Envelope_CN (the Japan chou-4 envelope with the switched values of the top and bottom margins and the switched values of the left and right margins) can be displayed as a list of sheet size options displayed on the print setting screen of the drawing application 201. The JapanChou4Envelope_CN is a new sheet size with the switched values of the top and bottom margins and the switched values of the left and right margins that is added to the PDC. Alternatively, either one of the two sheet sizes can be displayed. In a case where, for example, an operation for displaying the sheet size setting items provided by the drawing application 201 is performed, the drawing application 201 transmits a request to acquire sheet size information to the OS. The OS then acquires sheet size information from the PDC and shares the acquired sheet size information with the drawing application 201, whereby the sheet size setting items provided by the drawing application 201 are displayed. The print setting screen displayed by the drawing application 201 can be a screen similar to the print setting screen 801 in FIG. 8A or a screen different from the print setting screen 801.

In a case where a user opens the print setting screen 801 of the extension application 204 from the drawing application 201 and sets a sheet size on the displayed print setting screen 801, the drawing application 201 can acquire margin information about the set sheet size and a drawable area of the set sheet size using the API of the OS. Thereafter, if a print instruction is issued from the drawing application 201 to a print queue associated with the extension application 204, the drawing application 201 generates drawing data based on the acquired margin information and the acquired drawable size.

Figure 9:
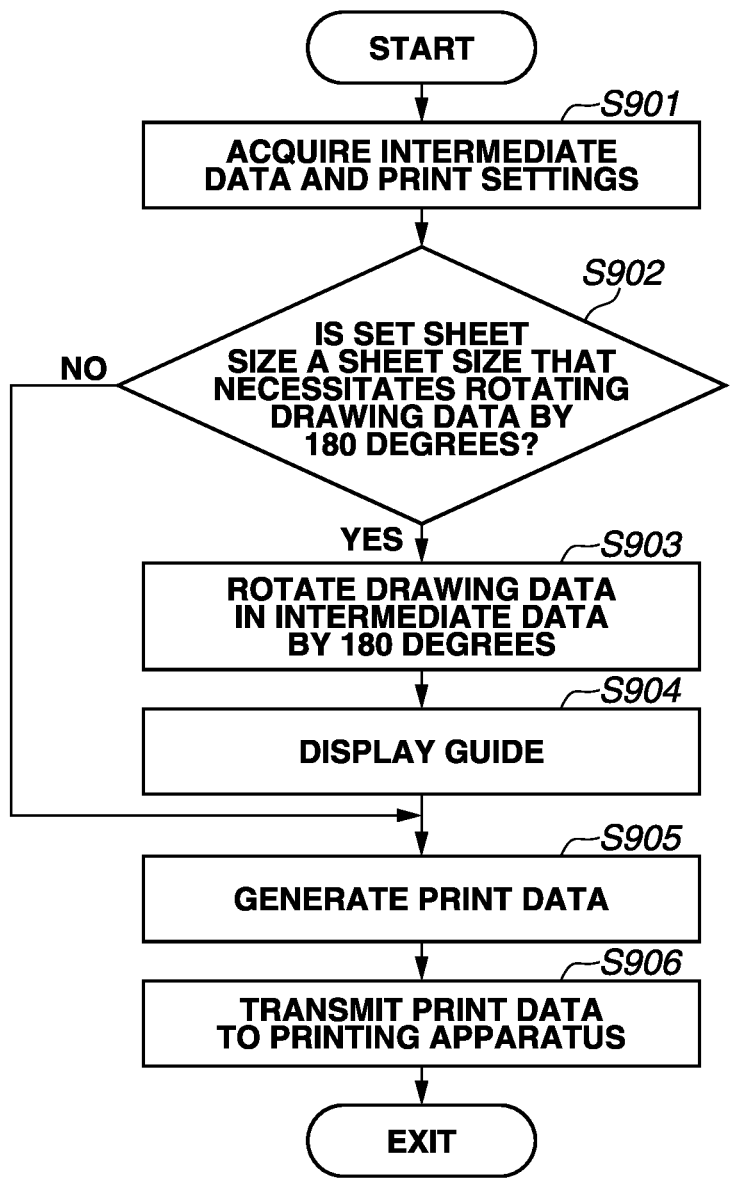
FIG. 9 is a flowchart illustrating a print process.

FIG. 9 corresponding to step S603 in FIG. 6 is a flowchart illustrating a print process performed by the print data editing unit 208 after the intermediate data including the drawing data and the print setting is transmitted to the print data editing unit 208 by the OS. The process in the flowchart is started in a case where the intermediate data including the drawing data and the print setting is transmitted to the print data editing unit 208 by the OS. While the extension application 204 and the units are sometimes described as a performer of a process, in reality, a corresponding function is realized by the CPU 111 by executing a corresponding program.

In step S901, the print data editing unit 208 receives the intermediate data including the drawing data and the print setting information from the print data generation software 202. The print setting information includes details of the setting configured by the user on the print setting screen in FIG. 8A.

In step S902, the print data editing unit 208 determines whether the sheet size set on the print setting screen 801 is a sheet size that necessitates rotating the drawing data by 180 degrees based on the print setting information acquired in step S901. Specifically, it is determined whether a sheet size that is a target of the control of changing the orientation of the drawing data such that the drawing data is printed with the bottom side and the top side of the drawing data respectively corresponding to the downstream side and the upstream side of the sheet in the sheet conveyance direction is set. For example, in a case where the portrait envelope is set, it is determined that a sheet size that necessitates rotating the drawing data by 180 degrees is set. In a case where the print data editing unit 208 determines "YES" in step S902, the processing proceeds to step S903, whereas in a case where the print data editing unit 208 determines "NO" in step S902, the processing proceeds to step S905. Specifically, in a case where a sheet size other than the portrait envelope, such as A4 size, is set, it is determined that a sheet size that does not necessitate rotating the drawing data by 180 degrees is set, so that the control is not performed of changing the orientation of the drawing data such that the drawing data is printed with the bottom side and the top side of the drawing data respectively corresponding to the downstream side and the upstream side of the sheet in the sheet conveyance direction.

In step S903, the print data editing unit 208 rotates the drawing data in the intermediate data by 180 degrees. Specifically, the print data editing unit 208 performs the control of changing the orientation of the drawing data such that the drawing data is printed with the bottom side and the top side of the drawing data respectively corresponding to the downstream side and the upstream side of the sheet in the sheet conveyance direction. For example, in a case where a sheet size, such as the portrait envelope, that necessitates rotating the drawing data by 180 degrees is set, the print data editing unit 208 rotates the drawing data including the margin area and the image data in the intermediate data by 180 degrees.

Figure 10:
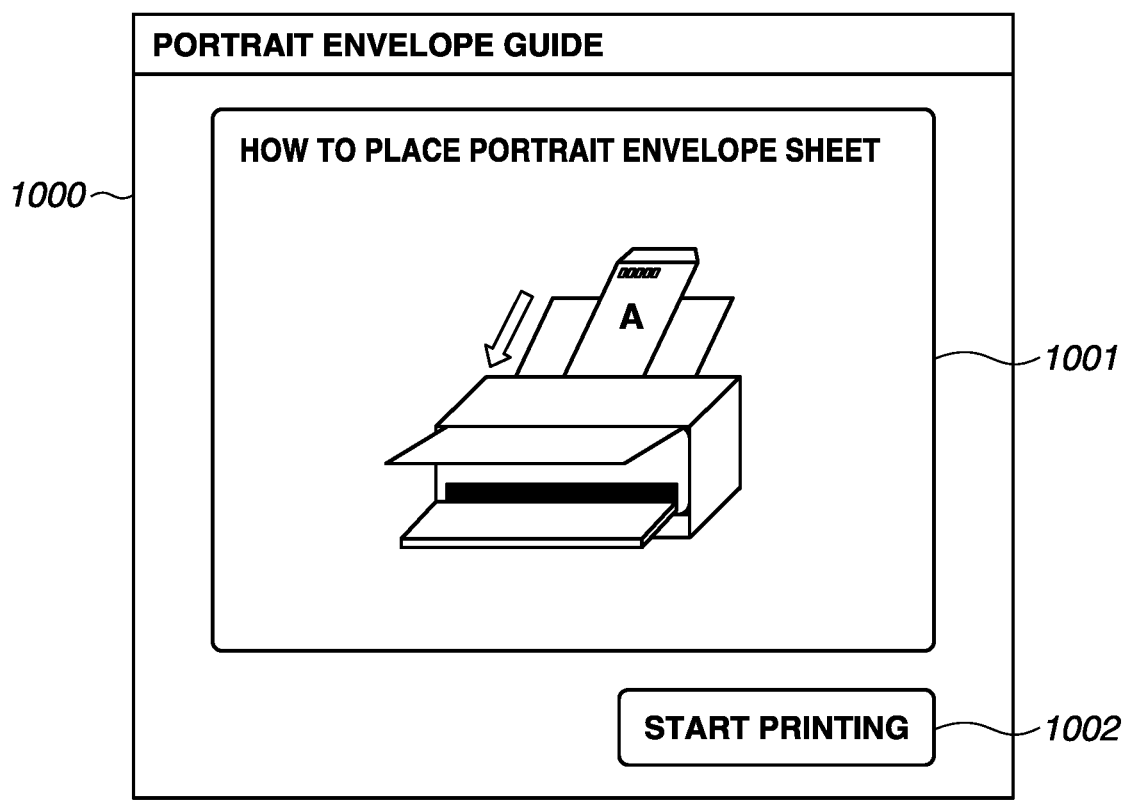
FIG. 10 illustrates an example of a guide screen.

In step S904, the print data editing unit 208 displays a guide screen indicating a procedure of placing the sheet on the printing apparatus 102. FIG. 10 is a diagram illustrating an example of a portrait envelope printing guide and is an example of a case where the Japan chou-4 envelope is set as the sheet size on the print setting screen 801 and a print instruction is issued. A guide screen 1000 includes a sheet placement procedure 1001 and a start-printing button 1002. The sheet placement procedure 1001 is a guide about a method for placing a sheet in a sheet feeding opening, and a guide that corresponds to a sheet feeding opening set via the print setting can be displayed. The start-printing button 1002 is a button with which a user issues a print start instruction, and when the start-printing button 1002 is pressed, a print instruction is transmitted to the printing apparatus 102, and the print data editing unit 208 closes a guide screen 1000.

In step S905, the print data editing unit 208 converts the intermediate data into print data interpretable by the printing apparatus 102.

In step S906, the print data editing unit 208 transmits the print data to the printing apparatus 102, and the process in the flowchart is ended. Thereafter, the printing apparatus 102 performs printing.

Figure 11A:
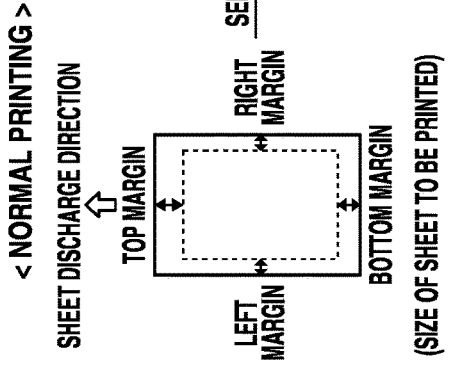
FIGS. 11A and 11B illustrate an example of a print result.
Figure 11B:
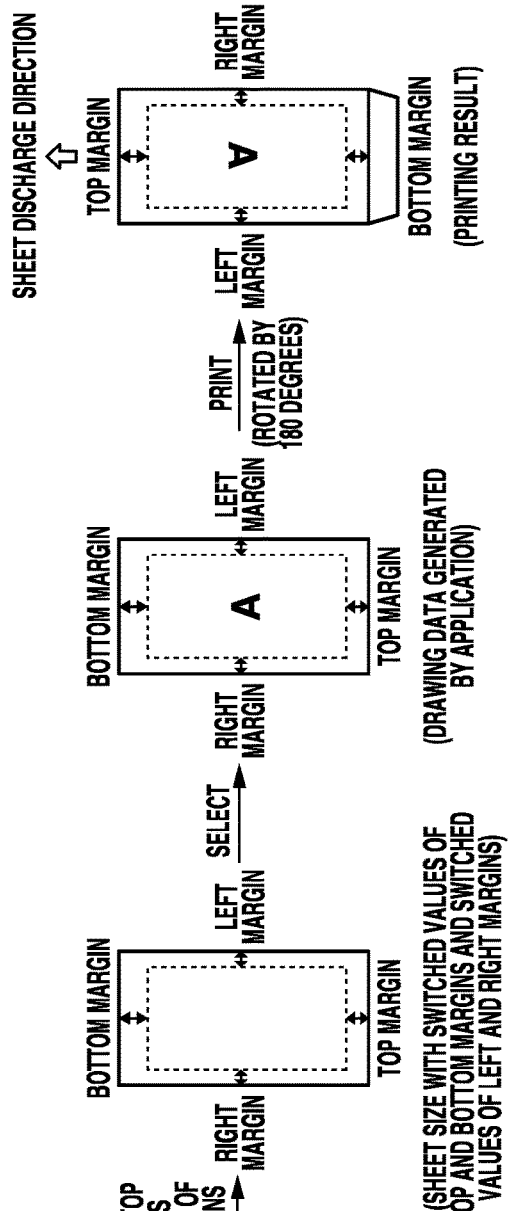

FIGS. 11A and 11B are diagrams illustrating sheet sizes to be printed and actual print results, and each broken line in FIGS. 11A and 11B indicates a drawable area on a sheet. FIG. 11A is a diagram illustrating a print result in a case where a sheet size that does not necessitate rotating the drawing data by 180 degrees is set and printing is performed. In this case, the drawing start position of the sheet size that is originally described in the PDC is transferred to the drawing application 201, and the drawing application 201 generates the drawing data based on the drawing start position. When a print instruction is issued, the drawing data arranged in the drawing region of the sheet size that is originally described in the PDC is transferred to the extension application 204, and the extension application 204 does not rotate the drawing data by 180 degrees. Thus, the drawing data is not rotated by 180 degrees, the values of the top and bottom margins of the sheet size are now switched, and the values of the left and right margins of the sheet size are not switched. Thus, a printing is performed in the orientation with the downstream side of the sheet in the sheet conveyance direction corresponding to the top side of the drawing data, as a print result.

FIG. 11B is a diagram illustrating a print result in a case where a sheet size that necessitates rotating the drawing data by 180 degrees is set and printing is performed. In this case, instead of the drawing start position of the sheet size originally described in the PDC, a drawing start position based on values obtained by switching the value of the top margin of the sheet size described in the PDC with the value of the bottom margin of the sheet size and switching the value of the left margin of the sheet size with the value of the right margin is transferred to the drawing application 201, and the drawing application 201 generates the drawing data based on the drawing start position.

When a print instruction is issued, the drawing data arranged in the drawing region based on the switched values of the top and bottom margins of the sheet and the switched values of the left and right margins of the sheet size is transferred as intermediate data to the extension application 204, and the extension application 204 rotates the drawing data by 180 degrees. Thus, a print result is printed in the orientation with the downstream side of the sheet in the sheet conveyance direction corresponding to the bottom side of the drawing data and the upstream side of the sheet corresponding to the top side of the drawing data.

As described above, the extension application 204 provides, to the drawing application 201, the drawing start position that is based on the values obtained by switching the value of the top margin of the sheet size, which necessitates rotating the drawing data by 180 degrees, with the value of the bottom margin of the sheet size, and switching the value of the left margin of the sheet size with the value of the right margin of the sheet size, and this enables the drawing application 201 to generate the drawing data based on the margins of the correct orientation. Further, the extension application 204 rotates the drawing data generated by the drawing application 201 by 180 degrees, and this enables the drawing data to be printed in the correction orientation for the sheet size, such as the portrait envelope, that necessitates rotating the drawing data by 180 degrees. This decreases the possibility that the drawing data is printed with a missing portion or at a position deviated from the drawing region. Furthermore, automatically generating the drawing data rotated by 180 degrees compared to the orientation in a case where the drawing data is printed in the correct orientation reduces an operation to be performed by the user.

While a process of adding, to the PDC, a sheet size based on values obtained by switching a value of a top margin of a sheet size, which necessitates rotating the drawing data by 180 degrees, with a value of a bottom margin of the sheet size and switching a value of a left margin of the sheet size with a value of a right margin of the sheet size is described above according to the above-described embodiment, a form in which margins of a sheet size that necessitates rotating the drawing data by 180 degrees are not rotated by 180 degrees can be used. For example, although a sheet size necessitates rotating the drawing data by 180 degrees, in a case where top and bottom margins have the same value and left and right margins have the same value, the values of the top and bottom margins of the sheet size do not have to be switched, and the values of the left and right margins of the sheet size do not have to be switched. Furthermore, in a case where, for example, a sheet size that necessitates rotating the drawing data by 180 degrees is set and values of top and bottom margins have the same value or values of left and right margins have the same value, only the values of the top and bottom margins or the left and right margins that have different values can be switched without switching the values of the top and bottom margins or the left and right margins that have the same value. Alternatively, the values of the top and bottom margins can always be switched regardless of whether the values are the same, and the values of the left and right margins can always be switched regardless of whether the values are the same.

While the portrait envelope is described as an example of a sheet size that necessitates rotating the drawing data by 180 degrees according to the above-described embodiment, the present embodiment is not limited to the example. The present embodiment is applicable to a sheet size that is a sheet size other than the portrait envelope and necessitates rotating the drawing data by 180 degrees.

Further, the guide screen 1000 indicating the sheet placement procedure illustrated in FIG. 10 according to the above-described embodiment may not be displayed. Specifically, the processing of step S904 in the flowchart of FIG. 9 can be skipped.

A process of the extension application 204 in a case where the printing apparatus 102 includes a function of stapling processing (binding processing) and a user sets a performance target position of the stapling processing of the printing apparatus 102 on a sheet according to a second embodiment will now be described. In general, the stapling processing is performed on an upstream side of a sheet in the sheet conveyance direction. In a case where the stapling processing is set by a user via the print setting screen and a performance target position of the stapling processing on a sheet is set, the drawing data may need to be rotated by 180 degrees with respect to the correct orientation and the rotated drawing data is to be printed depending on the target position of the stapling processing. For example, in a case where the top side of the drawing data corresponds to the short side of the sheet and a setting of performing the stapling processing on "upper left" of the image data on the sheet is set, a layout needs to be arranged such that the top side of the drawing data corresponds to the upstream side of the sheet in the sheet conveyance direction. Thus, the extension application 204 adds a sheet size based on values obtained by switching values of top and bottom margins of the sheet set via the print setting screen and switching values of left and right margins of the sheet set via the print setting screen, to the PDC and, furthermore, rotates the drawing data by 180 degrees. Hereinafter, unless otherwise specified, configurations and processes are similar to those according to the first embodiment, so that redundant descriptions thereof are omitted.

Figure 12:
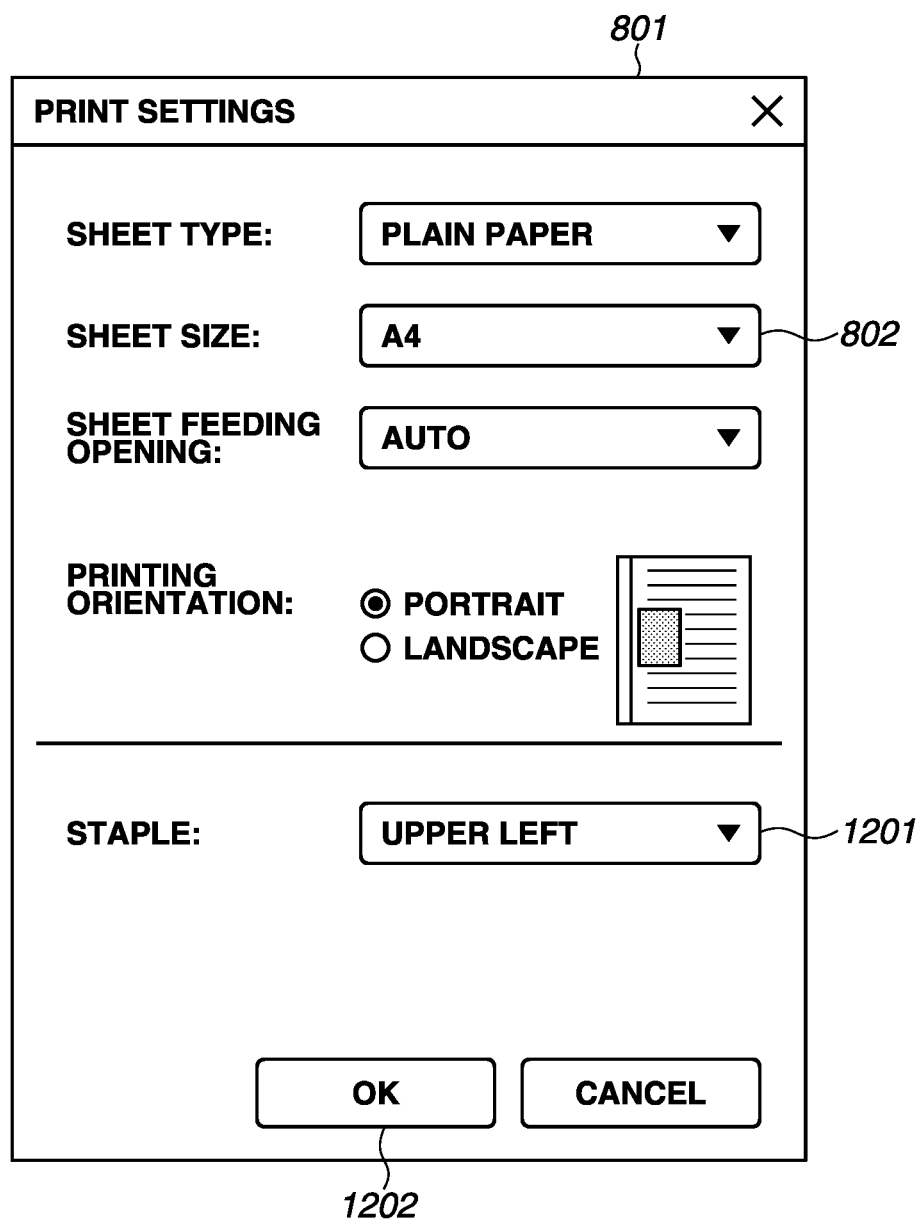
FIG. 12 illustrates an example of a print setting screen.

FIG. 12 illustrates a print setting screen 801 that is displayed by the print setting screen extension unit 205 when a user issues an instruction to display the print setting screen 801 of the extension application 204 from the drawing application 201 according to the present embodiment. According to the present embodiment, a staple setting 1201 can be designated, and "upper left" is set in the staple setting 1201 in FIG. 12. This indicates that the stapling processing is to be performed on an upper left position of the sheet size after the print processing.

Figure 13:
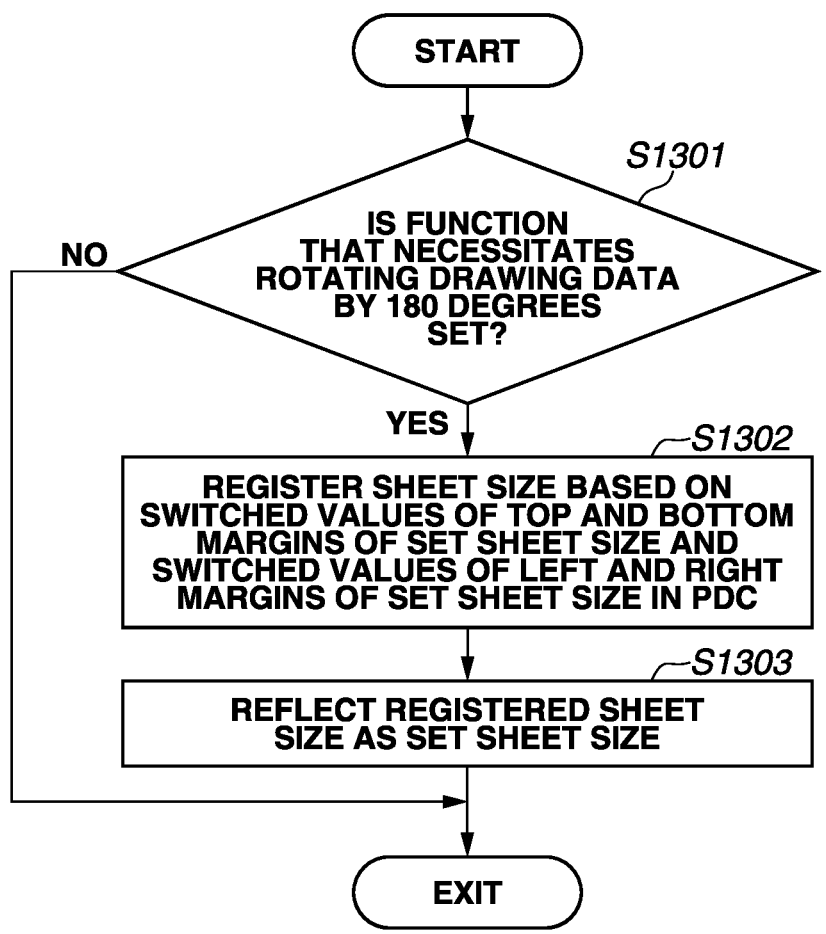
FIG. 13 is a flowchart illustrating a process of editing PDC.

FIG. 13 is a flowchart illustrating a process of editing the PDC by the print function extension unit 207. The process in the flowchart in FIG. 13 is started when the print settings on the print setting screen in FIG. 12 are performed by a user and an OK button 1202 is pressed by the user. While the print function extension unit 207 is sometimes described below as a performer of a process, in reality, a corresponding function is realized by the CPU 111 by executing a corresponding program.

In step S1301, the print setting screen extension unit 205 determines whether a function that necessitates rotating the drawing data by 180 degrees is set. Specifically, it is determined whether a function that is a target of the control of changing the orientation of the drawing data is set such that the drawing data is printed with the bottom side and the top side of the drawing data respectively corresponding to the downstream side and the upstream side of the sheet in the sheet conveyance direction. A case where a function that necessitates rotating the drawing data by 180 degrees is set refers to a case where, when the top side of the drawing data corresponds to the short side of the sheet, a position at the top side of the drawing data is set as a stapling processing position. An example of the case is a case where "upper left" is set in the staple setting 1201 in FIG. 12. A case where a function that necessitates rotating the drawing data by 180 degrees is not set refers to a case where, when the top side of the drawing data corresponds to the short side of the sheet, a position at the bottom side of the drawing data is set as a stapling processing position. An example of the case is a case where "lower right" is set in the staple setting 1201 in FIG. 12. In a case where the print setting screen extension unit 205 determines "YES" in step S1301, the processing proceeds to step S1302, whereas in a case where the print setting screen extension unit 205 determines "NO" in step S1301, the process in the flowchart is ended.

In step S1302, the print setting screen extension unit 205 registers, in the PDC, the sheet size based on the values obtained by switching the values of the top and bottom margins of the sheet size set on the print setting screen 801 and switching the values of the left and right margins of the sheet size. Specifically, a drawing region based on values obtained by switching a value of a length of a top margin area of the specified sheet size with a value of a length of a bottom margin area of the specified sheet size and switching a value of a length of a left margin area of the specified sheet size with a value of a length of a right margin area of the specified sheet size, is registered as values of the new drawing region of the specified sheet size in the PDC. At this time, the print setting screen extension unit 205 can overwrite margin information about the sheet size previously defined in the PDC or can add the sheet size with the new defined margin information to the PDC.

In step S1303, the print setting screen extension unit 205 reflects, to the OS, the sheet size with the margins rotated by 180 degrees by issuing an instruction to re-generate PC based on the edited PDC to the OS. Specifically, the drawing region based on the values obtained by switching the value of the length of the top margin area of the sheet size with the value of the length of the bottom margin area of the sheet size and switching the value of the length of the left margin area of the sheet size with the value of the length of the right margin area of the sheet size, is reflected as values of the drawing region of the sheet size designated by the user. The drawing application 201 can acquire the sheet size with the margins rotated by 180 degrees via the API of the OS.

Figure 14:
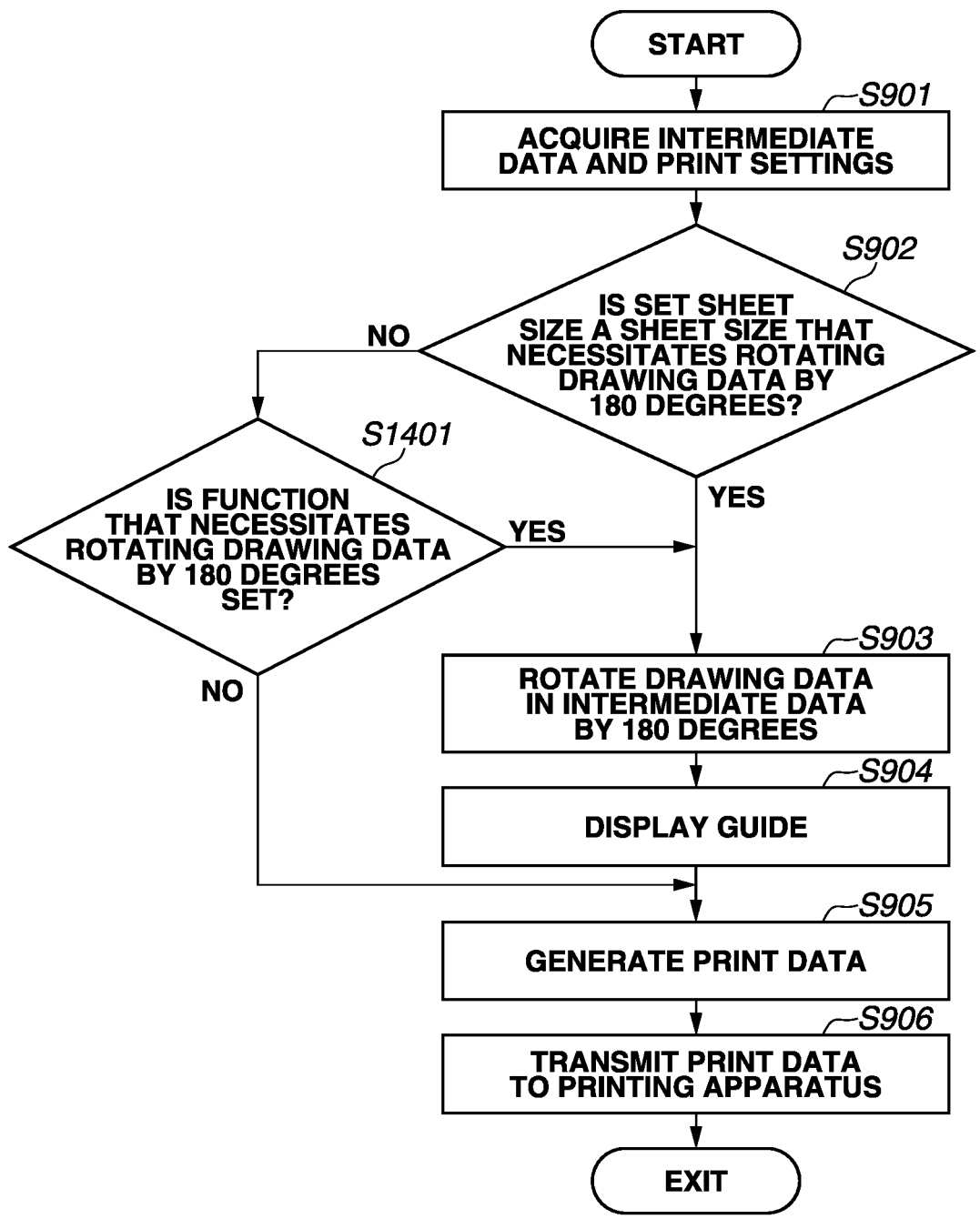
FIG. 14 is a flowchart illustrating a print process.

Thereafter, in a case where the user issues a print instruction to the print queue associated with the extension application 204 from the drawing application 201, a process of printing illustrated in FIG. 14 is performed.

FIG. 14 is a flowchart illustrating a process of printing by the print data editing unit 208 after intermediate data is transmitted to the print data editing unit 208 by the OS. The process in the flowchart in FIG. 14 is started in a case where intermediate data is transmitted to the print data editing unit 208 by the OS.

Steps S901 to S906 are similar to steps S901 to S906 in FIG. 9, so that redundant descriptions thereof are omitted. In a case where the determination result in step S902 is "YES", the processing proceeds to step S903, whereas in a case where the determination result in step S902 is "NO", the processing proceeds to step S1401.

In step S1401, the print data editing unit 208 determines whether a function that necessitates rotating the drawing data by 180 degrees is set on the print setting screen 801 based on the acquired print setting information. Specifically, it is determined whether a function that is a target of the control of changing the orientation of the drawing data is set such that the drawing data is printed with the bottom side and the top side of the drawing data respectively corresponding to the downstream side and the upstream side of the sheet in the sheet conveyance direction. Specifically, in a case where "upper left" is set in the staple setting 1201 on the print setting screen 801 in FIG. 13, it is determined that a function that necessitates rotating the drawing data by 180 degrees is set. Specifically, in a case where the sheet size registered in the PDC in step S1302 and reflected in the OS in step S1303 in FIG. 13 is set, it is determined that a function that necessitates rotating the drawing data by 180 degrees is set in step S1401. In a case where the determination result in step S1401 is "YES", the processing proceeds to step S903, whereas in a case where the determination result in step S1401 is "NO", the processing proceeds to step S905.

Figure 15:
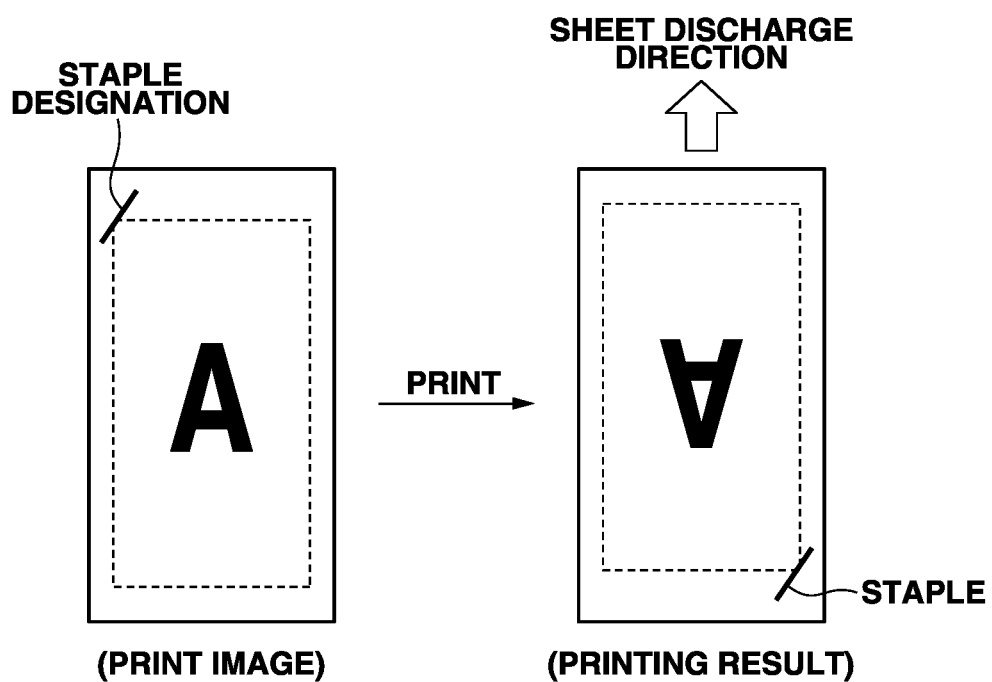
FIG. 15 illustrates an example of a print result.

FIG. 15 is a diagram illustrating a print result in a case where a function that necessitates rotating the drawing data by 180 degrees is set and printing is performed. Each broken line in FIG. 15 indicates a drawable area on the sheet. This is an example of a print result in a case where the stapling processing that can be performed by the printing apparatus 102 is performed on the upstream side in the sheet conveyance direction and a performance target position of the stapling processing is set to "upper left" of the sheet as a print setting, according to the present embodiment. In a case where a function that necessitates rotating the drawing data by 180 degrees is set on the print setting screen 801, instead of the drawing start position of the sheet size that is originally described in the PDC, the drawing start position based on the values obtained by switching the value of the top margin of the sheet size described in the PDC with the value of the bottom margin of the sheet size and switching the value of the left margin of the sheet size with the value of the right margin of the sheet size, is transmitted to the drawing application 201. The drawing application 201 then generates the drawing data based on the information, and if a print instruction is issued, the drawing data arranged in the drawing region based on the values obtained by switching the value of the top margin with the value of the bottom margin and switching the value of the left margin with the value of the right margin is transmitted as intermediate data to the extension application 204, and the extension application 204 rotates the drawing data by 180 degrees. Thus, a print result is printed with a layout with the bottom side of the drawing data corresponding to the downstream side in the sheet conveyance direction. Specifically, the layout is performed such that the top side of the drawing data corresponds to the upstream side of the sheet in the sheet conveyance direction, so that the stapling processing is performed on the upper left of the drawing data printed on the sheet.

As described above, in a case where a function that necessitates rotating the drawing data by 180 degrees, such as the stapling processing, is set, the extension application 204 provides the sheet size based on the values obtained by switching the value of the top margin of the sheet with the value of the bottom margin of the sheet and switching the value of the left margin of the sheet with the value of the right margin of the sheet to the drawing application 201. This enables the drawing application 201 to generate the drawing data based on the correct margins. Further, the extension application 204 rotates the drawing data generated by the drawing application 201 by 180 degrees, thereby enabling the drawing data to be printed in the correct orientation. Thus, the stapling processing is performed on the position of the stapling processing on the sheet that is designated by the user.

While a case where the staple setting 1201 in FIG. 12 is set to "upper left" is described as an example of a case where a function that necessitates rotating the drawing data by 180 degrees is set according to the above-described embodiments, the embodiments are not limited to the example. The present embodiment is also applicable to a case where the staple setting 1201 in FIG. 12 is set to "upper right" in a case where the stapling processing is to be performed on the downstream side of the sheet in the sheet conveyance direction. Further, there may be a case where the top side of the drawing data corresponds to a long side of the sheet depending on a layout of the drawing data for the sheet. In this case, in a case where a position that does not correspond to the upstream side in the conveyance direction is set as a performance target position of the stapling processing on the image data, it is determined that a function that necessitates rotating the drawing data by 180 degrees is set. An example is a case where the upstream side of the sheet in the sheet conveyance direction corresponds to "upper right" or "lower right" of the sheet with respect to the image data, and "upper left" or "lower left" is set as a performance target position of the stapling processing.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-012428, filed Jan. 28, 2022, which is hereby incorporated by reference herein in its entirety.

What is claimed is:

1. A non-transitory storage medium storing an application configured to support a function of printing software, the printing software being configured to generate print data printable by a plurality of printing apparatuses provided by different vendors and to transmit the print data to the printing apparatuses, the application causing a computer to:

acquire drawing data and information about a print setting including information about a sheet on which the drawing data is to be printed, the drawing data including image data;

wherein in a case where the information about the sheet indicates a predetermined sheet, a first control of changing an orientation of the drawing data such that the drawing data is printed on the sheet in an orientation with a bottom side and a top side of the drawing data respectively corresponding to a downstream side and an upstream side of the sheet in a conveyance direction of conveying the sheet to a printing apparatus configured to perform print processing to print the drawing data based on the print data is performed, and wherein in a case where the information about the sheet does not indicate the predetermined sheet, the first control is not performed, wherein the drawing data include a margin area corresponding to a region where the image data is not to be printed, wherein a second control of switching a value of a top margin area of the margin area of the image data with a value of a bottom margin area of the margin area of the image data is a control of adding information about the sheet to print function information generated by the printing software, and wherein in a case where capabilities information about the printing apparatus that is acquired from the printing apparatus includes first information about the predetermined sheet, second information about the predetermined sheet based on a value obtained by switching a value of a length of a top margin area of the sheet with a value of a length of a bottom margin area of the sheet and switching a value of a length of a left margin area of the sheet with a value of a length of a right margin area of the sheet is newly added to the print function information.

2. The non-transitory storage medium according to claim 1, wherein in a case where the information about the sheet indicates the predetermined sheet, the second control is performed, and wherein in a case where the information about the sheet does not indicate the predetermined sheet, the second control is not performed.

3. The non-transitory storage medium according to claim 2, wherein the second control switches the value of the top margin area of the margin area of the image data with the value of the bottom margin area of the margin area of the image data and switches a value of a left margin area of the margin area of the image data with a value of a right margin area of the margin area of the image data.

4. The non-transitory storage medium according to claim 1, wherein the first control is a control of rotating the drawing data.

5. The non-transitory storage medium according to claim 1, wherein the predetermined sheet is a portrait envelope.

6. The non-transitory storage medium according to claim 1, the application causing the computer to perform a first determination of determining whether the information about the sheet indicates the predetermined sheet, wherein in a case where the first determination determines that the information about the sheet indicates the predetermined sheet, the first control is performed, and wherein in a case where the first determination determines that the information about the sheet does not indicate the predetermined sheet, the first control is not performed.

7. The non-transitory storage medium according to claim 1, the application causing the computer to perform a first determination of determining whether the information about the sheet indicates the predetermined sheet,
wherein in a case where the first determination determines that the information about the sheet indicates the predetermined sheet, the second control is performed, and
wherein in a case where the first determination determines that the information about the sheet does not indicate the predetermined sheet, the second control is not performed.

8. The non-transitory storage medium according to claim 1, wherein the print function information is information about a function relating to the print processing that is to be performed by the printing apparatus, and the printing software transmits the print function information to a drawing application configured to generate the drawing data.

9. The non-transitory storage medium according to claim 1, wherein the information about the sheet that is displayed on a print setting screen configured to display information about the print setting is only the second information.

10. The non-transitory storage medium according to claim 1, wherein the information about the sheet that is displayed on a print setting screen of a drawing application configured to generate the drawing data is the first information and the second information.

11. The non-transitory storage medium according to claim 1, wherein the printing software acquires information including the first information about the sheet and the second information about the sheet from the print function information and transmits the acquired information to a drawing application configured to generate the drawing data so that the first information about the sheet and the second information about the sheet are displayed on a print setting screen of the drawing application configured to display information about the print setting.

12. The non-transitory storage medium according to claim 1, wherein a guide about a method for feeding the sheet to the printing apparatus is displayed.

13. The non-transitory storage medium according to claim 1, the application causing the computer to transmit the drawing data and the information about the print setting to the printing apparatus,
wherein the printing apparatus performs print processing for the drawing data.

14. An information processing apparatus including an application configured to support a function of printing software, the printing software being configured to generate print data printable by a plurality of printing apparatuses provided by different vendors and to transmit the print data to the printing apparatuses, the information processing apparatus comprising at least one processor operating to:
acquire drawing data and information about a print setting including information about a sheet on which the drawing data is to be printed, the drawing data including image data,
wherein in a case where the information about the sheet indicates a predetermined sheet, a first control of changing an orientation of the drawing data such that the drawing data is printed on the sheet in an orientation with a bottom side and a top side of the drawing data respectively corresponding to a downstream side and an upstream side of the sheet in a conveyance direction of conveying the sheet to a printing apparatus configured to perform print processing to print the drawing data based on the print data is performed, and
wherein in a case where the information about the sheet does not indicate the predetermined sheet, the first control is not performed,
wherein the drawing data include a margin area corresponding to a region where the image data is not to be printed,
wherein a second control of switching a value of a top margin area of the margin area of the image data with a value of a bottom margin area of the margin area of the image data is a control of adding information about the sheet to print function information generated by the printing software, and
wherein in a case where capabilities information about the printing apparatus that is acquired from the printing apparatus includes first information about the predetermined sheet, second information about the predetermined sheet based on a value obtained by switching a value of a length of a top margin area of the sheet with a value of a length of a bottom margin area of the sheet and switching a value of a length of a left margin area of the sheet with a value of a length of a right margin area of the sheet is newly added to the print function information.

15. A method for controlling an information processing apparatus including an application configured to support a function of printing software, the printing software being configured to generate print data printable by a plurality of printing apparatuses provided by different vendors and to transmit the print data to the printing apparatuses, the method comprising:
acquiring drawing data and information about a print setting including information about a sheet on which the drawing data is to be printed, the drawing data including image data,
wherein in a case where the information about the sheet indicates a predetermined sheet, a first control of changing an orientation of the drawing data such that the drawing data is printed on the sheet in an orientation with a bottom side and a top side of the drawing data respectively corresponding to a downstream side and an upstream side of the sheet in a conveyance direction of conveying the sheet to a printing apparatus configured to perform print processing to print the drawing data based on the print data is performed, and
wherein in a case where the information about the sheet does not indicate the predetermined sheet, the first control is not performed,
wherein the drawing data include a margin area corresponding to a region where the image data is not to be printed,
wherein a second control of switching a value of a top margin area of the margin area of the image data with a value of a bottom margin area of the margin area of the image data is a control of adding information about the sheet to print function information generated by the printing software, and
wherein in a case where capabilities information about the printing apparatus that is acquired from the printing apparatus includes first information about the predetermined sheet, second information about the predetermined sheet based on a value obtained by switching a value of a length of a top margin area of the sheet with a value of a length of a bottom margin area of the sheet and switching a value of a length of a left margin area of the sheet with a value of a length of a right margin area of the sheet is newly added to the print function information.

\* \* \* \* \*